(12) United States Patent
Vaziri et al.

(10) Patent No.: US 6,671,272 B2
(45) Date of Patent: Dec. 30, 2003

(54) INTERNET SWITCH BOX, SYSTEM AND METHOD FOR INTERNET TELEPHONY

(75) Inventors: Faramarz Vaziri, Port Ewon, NY (US); John D. Wimsatt, Washington, DC (US)

(73) Assignee: Fonefriend Systems, Inc., Washington, DC (US)

(*) Notice: Subject to any disclaimer, the term of this patent is extended or adjusted under 35 U.S.C. 154(b) by 0 days.

(21) Appl. No.: 10/003,047

(22) Filed: Dec. 6, 2001

(65) Prior Publication Data

US 2002/0089975 A1 Jul. 11, 2002

Related U.S. Application Data

(60) Division of application No. 09/029,839, filed on Mar. 9, 1998, now Pat. No. 6,377,570, which is a continuation-in-part of application No. 08/810,148, filed on Feb. 25, 1997, now abandoned.

(51) Int. Cl.[7] .............................................. H04L 12/66
(52) U.S. Cl. ..................... 370/352; 370/356; 370/521
(58) Field of Search ................................ 370/351, 352, 370/353, 354, 355, 356, 389, 400, 401, 229, 465, 521, 474

(56) References Cited

U.S. PATENT DOCUMENTS

| | | | |
|---|---|---|---|
| 5,473,676 A | | 12/1995 | Frick et al. |
| 5,553,122 A | | 9/1996 | Haber et al. |
| 5,724,389 A | * | 3/1998 | Marko et al. ............... 375/225 |
| 5,726,976 A | * | 3/1998 | Thompson et al. ......... 370/229 |
| 5,732,078 A | | 3/1998 | Arango |
| 5,974,043 A | | 10/1999 | Solomon |
| 6,064,653 A | | 5/2000 | Farris |

FOREIGN PATENT DOCUMENTS

WO 9531060 11/1995

OTHER PUBLICATIONS

Greenfield D: "Voice Over the Internet? Make the Call", Data Communications, US, McGraw Hill. New York, vol. 26, No. 1, 1997. pp. 42, 44.
Hansson A et al.: "Phone Doubler—A Step Towards Integrated Internet and Telephone Communities" Ericsson Review, SE, Ericsson. Stockholm, No. 4, 1997, pp. 142–151.

* cited by examiner

*Primary Examiner*—Ajit Patel
(74) *Attorney, Agent, or Firm*—Stevens, Davis, Miller & Mosher, LLP

(57) ABSTRACT

An Internet switch box connects between a telephone set and a public switched telephone network (PSTN) line, the latter of which is used both for PSTN telephone conversations and for connection to an Internet service provider (ISP). The switch box contains hardware and embedded software for establishing a connection to an ISP and for Internet telephony. When two users, each having an Internet switch box connected to the telephone set, wish to have an Internet telephony conversation, one calls the other over the PSTN. When they agree to an Internet telephony conversation, they signal their Internet switch boxes, by pressing either buttons on the switch boxes or certain keys on the telephone keypads, to switch to Internet telephony. The switch boxes disconnect the PSTN call and connect to their ISPs. Once the switch boxes are on the Internet, they contact each other through a server which supplies Internet protocol (IP) addresses of switch boxes, and the users continue their conversation by Internet telephony. The users can also prearrange to call each other solely by Internet telephony, in which case they do not need to talk to each other over the PSTN.

11 Claims, 21 Drawing Sheets

```
unsigned char *itobcd (unsigned int decimalNumber, unsigned int &digitCount)
/*
given an integer, produces and returns a BCD (binary-coded
decimal) string, in which each byte (unsigned char) is logically split
into two 4-bit "nibbles", each of which contains one digit of the
original integer.  Also returned as an argument-by-reference is the
number of digits found in the original integer, which is useful for
later manipulations.

The most significant digit of the original integer is stored "first",
i.e. in the high-order nibble of the leftmost byte of the BCD string.

In the current implementation, (non-leading) zeroes in the original
integer are stored as hex digit 'A' (0xA) in order to distinguish them
from "blank" or "filler" nibbles and/or bytes, which actually contain
zeroes.
*/

{
    // these are static to reduce repeat memory allocation-- for FoneFriend static int numOfBytes;              // bytes needed to store it as BCD static int numOfDigits;             // for internal use only!
    static unsigned char *BCDbuf;       // the return value goes here
    static unsigned char *bytePtr;      // moving pointer for loading BCDbuf...
    static char BitShift;               // used for decimal-to-hex conversion
    static char BCDdigits[10] =             // this allows us to do tricks like
        { 0xA, 1, 2, 3, 4, 5, 6, 7, 8, 9 }; // storing digit 0 as 0xA // figure out the number of digits in 'decimalNumber'
    numOfDigits = log10((double) decimalNumber) - 1;
    if (numOfDigits <= 0)
        return NULL;
    digitCount = numOfDigits;   // digitCount is returned to the user numOfBytes = (int) ceil((double) numOfDigits / 2.0 );

//set up storage and pointers accordingly
    BCDbuf = new unsigned char[numOfBytes];
    bytePtr = &BCDbuf[numOfBytes-1];

// clear out the contents of BCDbuf-- correct functioning depends on this
    bzero(BCDbuf, numOfBytes) ;
```

FIG. 10A

```
    // we are storing BCD digits from most to least significant, going
    // left to right; and there are two digits per byte.  If there are
    // an odd number of digits to store, then the least significant decimal
    // digit will wind up in the HIGH-order nibble of the last (rightmost)
    // byte used; if there are an even number of digits, this last digit
    // will end up in the LOW-order nibble of the last byte.  Since we start
    // by storing the least significant decimal digit and move backwards,
    // we have to know right away which nibble to put it in.  QED.
 if (numOfDigits % 2)      // we have an odd number of digits
    BitShift = 4;          // start in high-order nibble (left-shift 4 bits)
 else BitShift = 0;        // start in low-order nibble (no shift)

while (numOfDigits--) {   // we have at least one more digit to do

// get the last digit of 'decimalNumber' and put it in the
    // appropriate nibble
  *bytePtr += (BCDdigits[decimalNumber % 10] << BitShift);

// now, we need to get ready to deal with the next digit.
    // crafty code alert! BitShift can have the values 0 and 4; if it
    // is currently 0, then we just handled the LOW-order nibble of a
    // byte, and we will stay within this byte to do the next digit.
    // But if BitShift is currently 4, we just did the HIGH-order byte
    // and we can move back to the previous byte.  The following
    // very confusing code does that for you:
  bytePtr -= (BitShift / 4) ;

// of course, the value of BitShift must now be toggled:

BitShift = 4 - BitShift;

// finally, we line up 'decimalNumber' to deal with the next digit
    // in line, by way of throwing away the last digit we looked at, which
    // was the least significant digit of decimalNumber'.
  decimalNumber /= 10;

// at long last, we're ready to copy the digit into the BCD string:
    //    *bytePtr += (BCDdigits[decimalNumber % 10] << BitShift);

} return BCDbuf;
 }
```

FIG. 10B

```
typedef struct {
unsigned short struct_type;
    // tells us how to interpret the tx_data
    // 1001  t_ConnectPacket
    // 1002  t_RxConnectPacket
  unsigned short len;   // length of data in tx_data
  char tx_data[252];    // 262 bytes to handle future expansion
} tx_packet;
```

FIG. 11A

```
typedef struct {
      unsigned char hw_version; // identifies the originator of this struct
    unsigned char sw_version; // 1 == 1st version //  the connection type should be the first bytes read.
      //  the types are:
      //        1 - caller non-1st time
      //        2 - called
      //        3 - caller 1st time
      //        4 - mmic
      //        5 - message
      //        7 - self-test
      //        8 - upgrade request
    unsigned short int connect_type;
    unsigned char my_phone_num[8];
    unsigned char his_phone_num[8];
    unsigned long my_serial_num;
    unsigned long his_serial_num;
    unsigned char my_ip[4];
    t_BillingData bill_rec;
} t_ConnectPacket;
```

FIG. 11B

```
typedef struct {
      unsigned long start_time; // start time of previous service
      unsigned long stop_time;  // duration (in seconds) of previous service
      unsigned char phone[8];   // phone number of previous call unsigned char stat_data[8]; // statistical data about previous service
} t_BillingData;
```

FIG. 11C

```
typedef struct {
  unsigned short struct_type;
      // tells us how to interpret the tx_data
      // 1001  t_ConnectPacket
      // 1002  t_RxConnectPacket
  unsigned short len;  // length of data in tx_data
  char tx-data[252];   // 252 bytes to handle future expansion
} tx packet;
```

FIG. 11D

```
typedef struct {
  // New fields added to allow for commands
  unsigned char pckt_type;  // 0 == message, 1 == error
  unsigned char me_type;
      // messages:
      // 0 = return usable IP addr,
      // 1 = no match: IP == 0.0.0.0,
      // 2 = go to another server; IP address given
      // 3 = no action to take (response to message or self-test; IP == 0.0.0.0)
      // errors:
      // 0 = problem on my end; retry from scratch
      // 1 = problem with your data; retry from scratch
      // 2 = you are not an active user of the requested FF Service.
  unsigned char commandType;
      // 0 == no command
      // 1 == contact command server for further commands
      //       send new IP addr in command
      // 2 == set Update Available light on
      // 3 == unset Update Available light
      // 4    new main server
      //       send new IP addr in command
      // 5 == new backup sever
      //       send new IP addr in command
  unsigned char commandSize;   // number of bytes found in command []
  unsigned char his_ip [4];
  unsigned long cur_time;
  char command[32];
      // If commandSize <= 28 we can rely on
      // bytes command[28] .. command[31] containing the
      // sender serial number just for debugging purposes.
      // we have not specified what a command looks like.
      // commandType == 2:
      //    commandSize = 8, command = "10 2 1\r\n"
      // commandType == 4:
      //    commandSize = 21, command = "0 1 0 137 140 7 222\r\n"
      // commandType == 21:
      //    commandSize = 8, command = "0 1 1 137 140 7 222\r\n"
} t_RxConnectPacket;
```

FIG. 11E

```
********** Results from generation of Statistics **********

***** Absolute Value Counters *****
  m Entered Idle state         : 985131
  m FFServer connection Requests: 0
  m Entered DescRead state     : 0
  m Entered DescWrite state    : 0
  m DescRead ok                : 0
  m DescRead failed: wrong size : 0
  m DescRead failed: disconnect : 0
  m DescRead failed: orderly rel: 0
  m DescWrite ok               : 0
  m DescWrite failed           : 0
  m Init New Descriptor        : 1
  m Conn discon in complete list: 0
  m Invalid Client Port        : 0
  m Entered Housekeeping       : 985099
  m Completed Connection RQ    : 0
  m Expired Connection RQ      : 0
  m Inactive Connection RQ     : 0
  m tnClient Write ok          : 29
  m tnClient Write failed      : 0
  m Serial Number Invalid      : 0
***** Maximum Value Counters *****
  m Max Complete Connection Q  : 0
  m Max Stack Size             : 0
  m Max Connection List Size   : 0
***** Minimum Value Counters *****
  m Min Stack Size             : 2147483647
  m Min Connection List Size   : 0
********** End of StatisticsReport **********

Monitoring Stopped
```

FIG. 11F

```
Mon Feb 23 13:06:31 1998> New logged session of FFServer

Mon Feb 23 13:06:31 1998> Number of Invalid Serial Numbers: 1000
Mon Feb 23 13:06:55 1998> New TNClient (IP.Port): 137.140.8.104.36239
Mon Feb 23 13:07:55 1998> Closing TNClient (IP.Port) = 137.140.8.104.36239

Mon Feb 23 13:07:56 1998> (CL) Unknown ConnectType (IP.Port): 137.140.8.104.36239
Mon Feb 23 13:07:57 1998> (CL) Wrong Packet Size  (IP.Port): 137.140.8.104.36239
Mon Feb 23 13:07:58 1998> (CL) PcktType != 1001   (IP.Port): 137.140.8.104.36239
Mon Feb 23 13:07:59 1998> (CL) tx_packetPtr was NULL (IP.Port): 137.140.8.104.36239
Mon Feb 23 13:07:60 1998> (CL) Failed on attempt to insert (IP.Port): 137.140.8.104.36239
```

FIG. 11G

INTERNET SWITCH BOX, SYSTEM AND METHOD FOR INTERNET TELEPHONY

CROSS-REFERENCE TO RELATED APPLICATIONS

This is a divisional of application Ser. No. 09/029,839, filed Mar. 9, 1998, now U.S. Pat. No. 6,377,570, which is a continuation-in-part of application Ser. No. 08/810,148 filed Feb. 25, 1997.

This is a continuation-in-part of U.S. patent application Ser. No. 08/810,148, filed Feb. 25, 1997, whose disclosure is hereby incorporated by reference in its entirety into the present disclosure.

FIELD OF THE INVENTION

The present invention relates to Internet telephony, i.e., placing telephone calls over a specific secondary network, such as the Internet, by way of a standard telephone connection using the Public Switched Telephone Network (PSTN).

DESCRIPTION OF RELATED ART

The technique of using the Internet to carry on telephone communications is commonly referred to as Internet Telephony (IT) or, sometimes, Voice on the Net (VON). IT is a way to communicate over the Internet that bypasses PSTN toll connections. IT can be advantageous for individuals and businesses that need or want to communicate extensively with others outside of their local calling areas, especially to frequently called numbers.

IT is typically accomplished by what is commonly referred to as Personal Computer-Based Internet Telephony (PCIT). PCIT allows users with properly equipped personal computers to complete long distance telephone calls to one another over the Internet without incurring a toll charge. To do so, the users must have personal computers that are multimedia capable in terms of possessing a sound card, sufficient processing power, a high quality microphone, an adequate modem (preferably 14.4 or faster) and the same specialized software programs, as well as an account with an online service or Internet service provider (ISP) for connection to the Internet via SLIP (the serial-line Internet protocol) or PPP (the point-to-point protocol). Current PCIT techniques are not compatible with shell accounts, which are accounts in which a user logs on through terminal emulation to a remote machine running Unix or the like and accesses the Internet through that remote machine in text mode by typing commands at a prompt Several PCIT software packages are on the market. These packages are mutually incompatible; two users wishing to make a PCIT connection must have the same software package. Popular PCIT software packages include those marketed under the names "Iphone" and "Web Phone."

The "Web Phone" software works in the following manner. The users wishing to speak to each other must both be online for the communication to take place, although they can arrange beforehand to be online at the same time.

Both users run the software, and the software packages on both computers seek each other by referring to each other's Internet protocol (IP) addresses. An IP address can be static, meaning that each user is assigned a single permanent IP address, or dynamic, meaning that a user is assigned a different IP address every time that user logs on. If the users both have static Internet protocol addresses, they can simply store each other's IP addresses beforehand. However, many users, including virtually all users of less expensive ISP's and of online services such as America Online, have dynamic IP addresses. Therefore, before the users can connect to each other, they must log onto a common server so that each one can find out the dynamic IP address which has been assigned to the other user. Either way, once the users have each other's IP addresses, the software packages can communicate with each other over TCP/IP (transfer control protocol/Internet protocol) ports 21845, 21846 and 21847.

Sound originating on one end is digitized via the microphone and sound card, compressed, and transmitted to the other end as packets over the Internet using TCP/IP, where the packets are decompressed and converted back into sound via the sound card and speakers.

There are, however, disadvantages associated with the present state of IT or VON. Besides the hardware requirements and the difficulty that many users have with configuring their computers to achieve SLIP or PPP connections to their ISPs, until such time as PCIT vendors can agree on standards, the requirement that both users have the same software to communicate with each other will remain. Not only is the hardware described above expensive, but extensive knowledge of computers and the Internet is also required, making IT intimidating to a majority of the population who would otherwise like to take advantage of this capability. There are other disadvantages to PCIT. Its users need to prearrange a time to call each other because both parties must take proactive measures to connect the call and thereby converse with each other.

Internet Telephony also sometimes refers to a new service being planned whereby individuals or businesses may use or pre-subscribe to a special access number and place their long distance telephone calls by way of a long distance carrier who uses the Internet to carry the calls. This service eliminates most of the disadvantages of PCIT, but also eliminates most of the advantages, in that toll and/or usage type charges still apply.

Devices are known for allowing PCIT by letting users initiate a conversation over the PSTN and switching to IT. Such devices exchange information relating to their IP addresses during the PSTN phase of the call so that the IT phase of the call can be completed. However, in such devices, the modem may be set or initialized twice, once for the PSTN phase of the call to exchange the IP address information and once for the IT phase of the call to connect to the Internet. Setting the modems twice is time-consuming. Also, such devices cannot be used for calls which take place entirely by way of IT, since they have no way of exchanging the IP address related information to locate each other.

SUMMARY OF THE INVENTION

It is an object of the invention to allow a user to make telephone calls via the Internet without a need for an expensive multimedia-capable personal computer.

It is another object of the invention to allow a user to make telephone calls via the Internet without a need to configure such a computer for a SLIP or PPP connection to the Internet.

It is a further object of the invention to allow a user to select a route for a telephone call (the Internet, the conventional PSTN, a dedicated network, etc.) and to use a single device for the call regardless of which route is selected.

It is a further object of the invention to provide a device and method for Internet telephony which are easy to use, do not require a computer and offer superb voice quality.

To these and other ends, the present invention is directed to a terminal device or Internet switch box (ISB) for connecting a first telephone set and a second telephone set over a selected one of a primary network and a secondary network, the switch box comprising: primary network connecting means for connecting the first telephone set to the primary network; secondary network connecting means for connecting the first telephone set to the secondary network and for establishing a connection over the secondary network between the first telephone set and the second telephone set; relay means for (i) connecting, when the relay means is in a first state, the first telephone set to the primary network connecting means and for (ii) connecting, when the relay means is in a second state, the first telephone set to the secondary network connecting means; and switching means for receiving a switch-over command to switch from the primary network to the secondary network and for controlling, in response to the switch-over command, (i) the relay means to disconnect the first telephone set from the primary network connecting means and to connect the first telephone set to the secondary network connecting means and (ii) the secondary network connecting means to establish the connection over the secondary network between the first telephone set and the second telephone set.

A relatively inexpensive interface device, referred to as an Internet switch box (ISB), is connected to or integrated within the telephone. While the user must possess access to the Internet either directly or via an Internet Service Provider (ISP) in order to use the ISB, the user will not be subject to toll charges other than those incurred using the PSTN to establish the Internet telephone call. The user does not need to understand how a computer works or how to use any PCIT software, since the ISB can be preprogrammed to dial an ISP and to connect via SLIP or PPP. The user need only know how to dial the call using normal PSTN dialing procedures and then simply switch the call to an Internet connection, if available and desirable. Other than the user pressing a button (either on the ISB or telephone keypad) to initiate the Internet telephone call, the ISB takes care of all connection procedures (i.e., handshaking) necessary to set up and maintain the Internet telephone call. While both parties must possess an ISB in order to take advantage of the ISB's IT capabilities, only one party needs to initiate the telephone call in order to establish the Internet connection, so that prearrangement is not required.

Advantageously, the selection among networks may be among the PSTN, selected proprietary networks, or the Internet. It should be noted that the PSTN utilizes circuit switching techniques whereas, for instance, the Internet makes use of packet switching. Circuit switching was specifically designed and is best for analog voice transmissions, whereas packet switching was designed and is best for digital data transmissions. Regardless, either type of switching may be employed for voice or data. The calling party uses the PSTN to first establish the connection between calling and called parties, and then the two parties decide whether or not to use their ISB's to re-establish the connection via a secondary network such as the Internet. The users will consider convenience, cost and connection quality in making this choice. If the telephone call is to another party in the same local calling area, of short duration, or one where, regardless of cost, the stability and voice quality of the connection are essential, then the users typically opt to stay on the PSTN connection and not seek to switch to the Internet. Otherwise, the potential cost savings of simply switching to an Internet connection make doing so preferable.

As indicated, an ISB may be incorporated into a telephone or be a standalone adjunct device connected between the telephone and the telephone line. Additionally, ISB's may be associated with facsimile machines, wireless telephones and multiple line telephone systems, such as key telephone and Private Branch Exchange (PBX) systems, and operate to provide multiple users of such Customer Provided Equipment (CPE) the ability to designate the secondary network handling of their toll calls. According to one embodiment, the ISB will set up a secondary network or Internet telephone call after the PSTN connection has been established and in response to a command to do so by its user(s) as described above. In an alternative embodiment, the ISB may be configured to establish a connection over a secondary network automatically unless commanded not to prior to the call being placed. In either case the called telephone can answer or simply ring before the telephone call can be switched to a secondary network or the Internet. As such, the ISB does not interfere with accepted and customary PSTN procedures in that the PSTN portion of the telephone call is billable only if there is an answer by a live person or an answering machine or voice mail service.

In order to establish a secondary network or Internet connection via the ISB, the user will first dial the PSTN telephone number of the intended call recipient. Once the called telephone is answered, which is a billable PSTN telephone call of short duration, both parties initiate, via a simple key stroke, the switch to the secondary network. The two ISB's disconnect the PSTN call, and each initiates its own call to the other via the secondary network. If the secondary network is the Internet, the connection typically is by way of an Internet Service Provider (ISP) which can be reached, advantageously, by a toll-free telephone call enabling access to the user's Internet service account which, advantageously, has unlimited use or use charges in an amount much lower than the expected PSTN charges. The two ISB's possess information (i.e., addresses, passwords, etc.) necessary to re-connect the telephone call via the secondary network. Each ISB can be programmed to provide call progress tones or to play pre-recorded messages, music, etc., while the users await reconnection. If the call cannot be connected via the secondary network due to access problems at the ISP or otherwise, then each party is so informed by a recognizable audio signal such as a busy signal or a voice recording. Either or both parties can, by pressing appropriate keys, retry their connection via the Internet or reconnect the telephone call over the PSTN. This capability is somewhat analogous to the redial capability on many conventional telephones. Should two parties seek to avoid PSTN charges altogether, they may use this same capability to do so via prearrangement. In so doing, each party need only input the other party's telephone number in addition to pressing the appropriate buttons on the ISB or telephone keypad. Regardless, once the call is connected via the secondary network or the Internet, the parties terminate the call by hanging up, as with any PSTN call.

The present invention thus implements an embedded approach to IT which offers the following advantages. The use of ISB's allows low-cost, easy-to-use, embedded Internet access for telephones. Lower cost is achieved because no PC's are required. Users, many of whom would prefer not to have to configure a PC for Internet access, are offered a familiar PSTN approach which can identify a called party by that party's existing telephone number. This approach also preserves the major advantage of IT, namely, the use of low-cost Internet bandwidth.

While the invention is intended primarily for use with single-line analog telephone sets, it can be adapted for use with other telephone systems, such as DID PBX (direct-indial private branch exchange) and Centrex service and with analog or digital mobile telephones such as cellular telephones and PCS personal communication service) telephones. Also, while the ISB can be built to access the ISP through a dial-up connection, it can alternatively be built to access the ISP through another connection, such as an ISDN (integrated services digital network) connection or a cable modem connection.

BRIEF DESCRIPTION OF THE DRAWINGS

The preferred embodiment will now be described in detail with reference to the drawings, in which:

FIGS. 10A and 10B show a code listing for the ISBSS;

FIGS. 11A–11E show data structures exchanged between the ISBSS and an ISB;

FIG. 11F shows an output of a monitoring process performed by the ISBSS;

FIG. 11G shows an error log kept by the ISBSS;

DETAILED DESCRIPTION OF THE PREFERRED EMBODIMENT

According to a preferred embodiment, the ISB is capable of performing three major tasks: (1) establishing voice telephone calls via the Internet; (2) sending/receiving voice messages via Internet based E-Mail; and (3) interfacing with Internet Audio Servers.

During the execution of each task, one of the following five modes of operation can be assumed by the ISB:

I. Programming Mode: The ISB can be programmed locally or remotely by a telephone keyset or external keyboard for its desired operation.

II. PSTN Voice Mode: The ISB is transparent and does not interfere with voice communications between two parties involved.

III. PSTN Data Mode: The ISBs can exchange data via in-band signaling or otherwise.

IV. Internet Voice Mode: UDP packets are exchanged to carry voice over the Internet ("UDP" stands for "User Datagram Protocol," a protocol which allows applications to send messages to one another).

V. Internet Data Mode: TCP or UDP packets are exchanged to carry information other than voice, such as signaling or IP address resolution.

Figure 1:
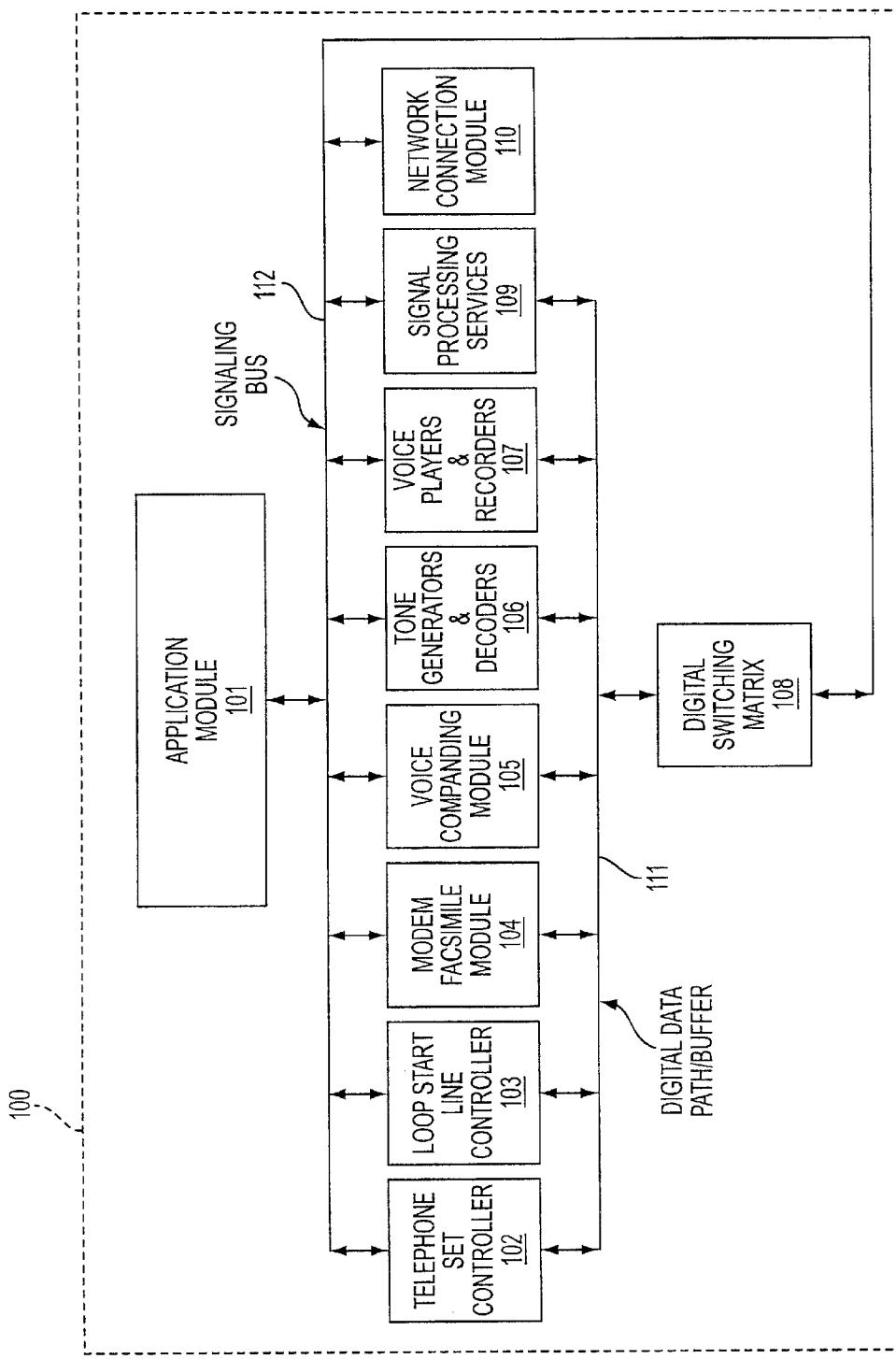
FIG. 1 is a flow chart depicting the functional organization of the ISB.

These modes of operation are realized by invoking a collection of resources in the ISB 100 which are under control of the ISB's application module 101. These resources are shown in FIG. 1 and described below:

Telephone Set Controller (TSC) 102 is a module which controls all signaling activities related to a "Plain Old Telephone" (POT), i.e., on-hook, off-hook, hook-flash, pulse or tone dialing, ringing, ringing trip detection, etc.

Loop/Start (L/S) Line Controller (LLC) 103 is a module which controls all signaling related to a loop start telephone line, i.e., ring detection, line seizure, hold, loop current detection, pulse and tone dialing, etc.

Modem/Facsimile Module (MFM) 104 is a module which provides a modem and facsimile engine to transmit digital data over PSTN line. The baud rates of the modem/fax are determined by data exchange requirements.

Voice Compander (=compresser and expander) Module (VCM) 105 is a module which compresses the linearly sampled voice into low bit rate digital voice suitable for digital telephone applications. The expander part of the module performs the reverse operation.

Tone Generators and Decoders (TGD) 106 is a module which produces and detects all call progress (e.g., dial, busy, special, etc.) and signaling (e.g., dual-tone multifrequency or DTMF, multifrequency or MF, etc.) tones.

Voice Players and Recorders (VPR) 107 is a module which records and plays voice prompts under the direction of the ISB.

Digital Switching Matrix (DSM) 108 is a module which enables the different modules (i.e., TSC, LCC, TGD, VPR, etc.) can be connected together via buses 111 and 112.

Signal Processing Services (SPS) 109 is a module which handles signal processing services such as echo cancellation, speech recognition, pitch adjustment, etc.

Network Connection Module (NCM) 110 is a module which handles all digital networking communication between the ISB and other external digital sources such as the ISP, another ISB, various Internet resources and servers, etc. are handled by this module.

Application Module (AM) 101 is a module which provides the logic flow required to execute the above mentioned tasks.

The following describes several of the operations of the ISB:

1. Programming the ISB: The user uses the telephone keypad and menu button 301 on front panel 302 of the ISB (FIG. 3) to enter the programming mode (local or remote). The ISB guides the user through a menu-driven procedure to program the ISB by using voice prompts, guide tones or both. The user inputs the desired information by entering a code with the telephone keypad corresponding to each character to be entered; the instruction manual for the ISB can include a table of two-digit codes for all digits, all capital letters, all small letters (thus allowing case-sensitive information to be entered with ease and accuracy), and any punctuation marks to be used. The ISB can be programmed externally (remotely) as well; external programming can be used to input user-specific data and to update the ISB. Local programming is especially useful when the user changes ISPs.

Programming can also be accomplished by connecting the ISB to a computer such as an IBM-compatible PC via a serial link or another appropriate link. The programming can be done by entering ASCII commands from the PC through a standard terminal-emulation program or by software written specifically for this purpose. During manufacture, the ISB is programmed with its factory settings through a connection to a computer.

2. Telephone call: The calling party picks up the telephone (goes off-hook) and dials the telephone number of the called party. The ISB monitors and stores the digits dialed. The called telephone rings and is answered by a live person, answering machine or voice mail service. If the called telephone is answered by a live person, the two parties decide whether or not it is appropriate to switch to the Internet. The parties may initiate the switch to the Internet by pressing the appropriate code on the telephone keypad or Internet button 303 in the ISB itself. The ISBs of the calling and called parties then disconnect the PSTN connection (this step is not necessary if the ISBs have multi-line capabilities) and dial their respective ISPs so that each ISB is connected to the Internet. While each ISB connects to the Internet, the person using the ISB hears progress tones, recorded music, or the like.

Once the ISBs are connected to the Internet, they connect to the server, unless (as is rather unlikely) each party knows that the other party has a static IP address and has that static IP address on file. Each ISB sends its telephone number and IP address to the server so that the server has a current IP address corresponding to each telephone number. Each ISB communicates the other party's telephone number to the server to retrieve the other party's IP address. Once each party knows the other party's IP address, the Internet telephone connection begins, and the ISBs send voice packets to each other. The ISBs can also resolve each other's IP address in other ways, such as through e-mail (POP3) servers.

Of course, two users are not precluded from arranging to call each other on the Internet at a certain time, in which case they avoid PSTN charges altogether. However, the use of the ISBs described above offers additional flexibility in that users can choose to prearrange their Internet calls or initiate them over the PSTN.

3. Sending and receiving voice mail messages: The user presses menu button 301 or otherwise issues a command to summon the menu and follows the prompts to send and receive messages. The digitized voices for such messages are sent as binary attachments to e-mail messages; one ubiquitous standard for such binary attachments is called MIME (multimedia Internet mail extensions). Both parties should have e-mail access. If the calling party does not already know the called party's e-mail address, the ISBSS or another server can correlate telephone numbers with e-mail addresses.

The ISB have the capability to dial in to check the e-mail for voice messages periodically. If a voice message is waiting, the ISB can so indicate by providing a flashing LED, by emitting a special tone when the user picks up the telephone, or the like.

4. Internet Audio Server (IAS) calls: These are calls made through the ISB to access IASs, or Internet audio servers, which are Internet servers (such as Web or FTP (file transfer protocol) servers) configured to provide audio information. The user picks up the telephone and presses the menu button 301 on the ISB. The menu system uses voice prompts to prompt the user to access different IASs. The ISB then accesses the selected IAS either by telephone or by dialing the ISP and connecting to the IAS over the Internet. The ISB can resolve the IP address of an LAS either by accessing the server described above or by accessing a conventional domain-name server (DNS), which is a server for correlating IP addresses and domain names such that the DNS provides an IP address when given a domain name. Once an IAS is known, the ISB can store the IP address, since servers provided for access by the general public normally have static IP addresses.

5. ISB special server: As noted above, a server is provided to allow the users of two ISBs to resolve each other's IP addresses. Such a server is known as an ISB special server (ISBSS), and it correlates telephone numbers to IP addresses. The ISBSS can look up an IP address for an ISB which has previously accessed the server and provided information correlating its telephone number and IP address. The ISBSS does this by searching by the telephone number, or the least significant digits of the telephone number, provided by another party wishing to access that ISB. The ISBSS also uses telephone numbers to find e-mail addresses and possibly also the IP addresses of IASs. With the ISBSS, the ISBs do not have to exchange information concerning their IP addresses directly during the PSTN phase of a telephone call.

The ISBSS can also collect and report transactions, statistical data about attempts, completions, etc. by type of call request and customer, for engineering and marketing purposes. The requirements for interfacing, processing and data storage with a computer based server such as the ISBSS will be readily understood by those skilled in the present state of the art. A fuller description of the ISBSS will be set forth below.

6. Compatibility with call waiting, caller ID, and other enhanced telephone features: According to one embodiment of the ISB, call waiting must be inactive to assure Internet call connection continuity. A disable code can be programmed to de-activate this feature when Internet telephone calls are in process. It is presumed that users who are on a long distance call do not want to be disturbed. Such disable codes are known in the art; for example, it is known to configure communication software to disable call waiting by dialing a code such as *70 and pausing before every call. Another embodiment of the ISB not only allows call waiting to function but also incorporate caller ID and other premium telephone services. For example, an ISB can have integrated caller ID and can even indicate whether the caller has an ISB, e.g., by searching by the telephone number through the ISB's database of completed calls.

Figure 2:
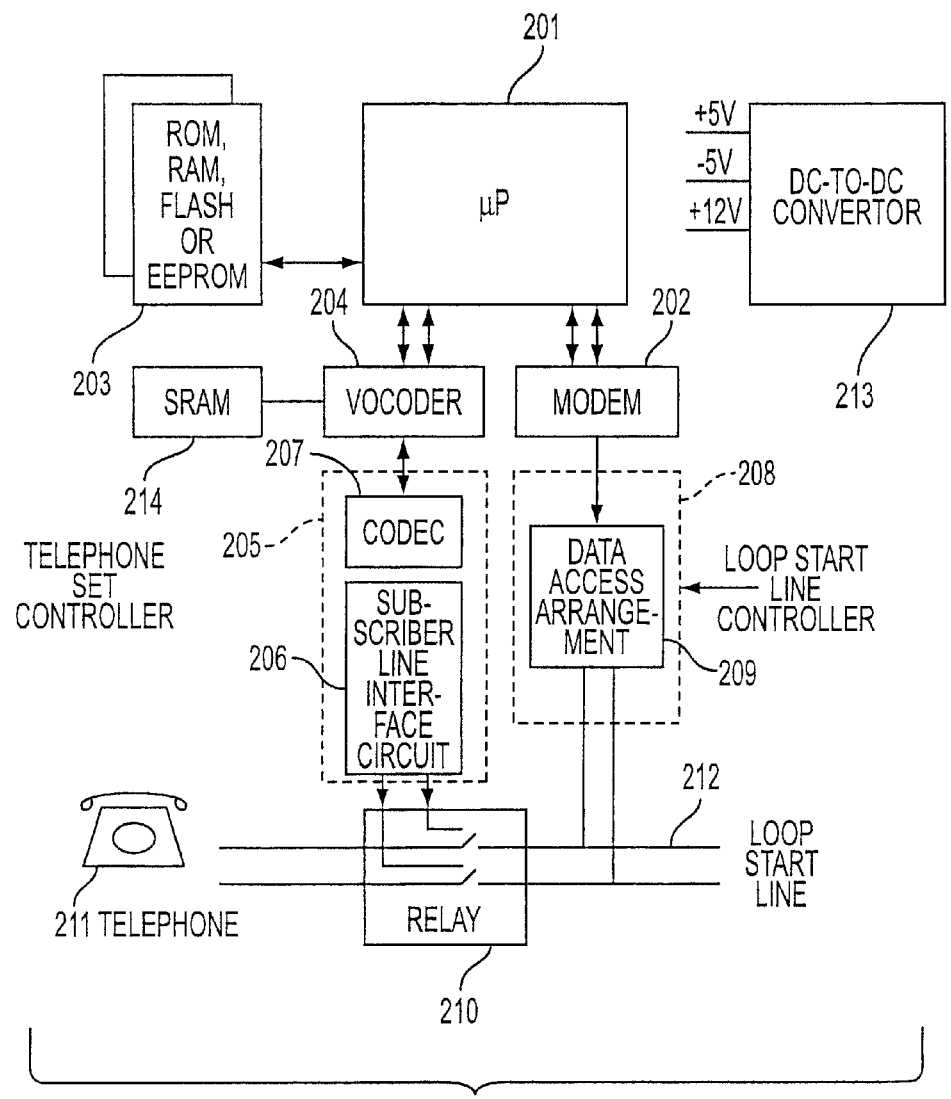
FIG. 2 is a block diagram of an embodiment of the ISB.

These and other operations are implemented on hardware and software which will now be described in detail. According to a preferred embodiment, the ISB is implemented by realizing the described modules by way of an existing personal computer or by repackaging the necessary personal computer capabilities into a commercially viable design. In the latter case, the ISB need not include those hardware or software capabilities which are not relevant to the functions which the ISB is expected to perform; therefore, the hardware and software can be radically simplified from those of a personal computer. In particular, the ISB can be implemented in hardware and software compatible with MS-DOS, rather than in the considerably more complicated and expensive hardware and software associated with operating systems such as Windows 95 or Windows NT. In the alternative, a design based on a digital signal processor (DSP) can be employed. Various elements of any designed embodiment such as the modem and vocoder functions can be implemented via hardware or software equivalents. Those skilled in the art are familiar with the computer telephony modules and software libraries which can easily implement the disclosed modules. The following describes a commercially efficient approach, and FIG. 2 shows a schematic illustration of this preferred embodiment.

The ISB includes PC-compatible microcontroller (microprocessor) 201, such as an Intel 80186 processor or an equivalent. Microcontroller 201 includes integrated timers, direct memory access (DMA) channels, serial links and interrupt handlers and is supported by a memory system 202 including, for example, ROM, SRAM, flash memory, or EEPROM. Microcontroller 201 and memory system 202 together form the main processing unit for the ISB. Memory system 202, besides providing working memory for the operation of the ISB, also stores such code as is needed to operate the ISB. For example, memory system 202 includes code for establishing an Internet connection; such code is analogous to a Winsock dialer on IBM-compatible PCs.

An internal DC-to-DC power converter 213 provides the proper voltages to the various components within the ISB. An appropriate external AC-to-DC adaptor interfaces the ISB to the available AC power alternatives found in the U.S. and elsewhere.

The modem 202 may be implemented most advantageously via a hardware modem or modem chip which is connected to the microcontroller 201 and the Loop Start Line Controller 208 and data access arrangement (DAA) 209, both of which are described below. Modem 202 can be a Rockwell 14.4 modem or any other suitable modem, although it should preferably be capable of a speed of at least 14.4 and should also preferably be upgradeable as new modem standards emerge.

The vocoder 204 may be most advantageously implemented via hardware which is connected to the microcontroller and which has its own SRAM 214. The vocoder provides low bit rate voice compression and decompression and interfaces the Telephone Set Controller 205.

The Telephone Set Controller 205 includes a Subscriber Line Interface Circuit (SLIC) 206 and a CODEC 207 which is, advantageously, connected to the vocoder. CODEC 207 allows SLIP or PPP connection to the Internet.

Loop Start Line Controller 208 includes a Data Access Arrangement (DAA) 209 and is connected to the modem 202 and the telephone line 212.

A 2 FORM C relay 210 is provided, as illustrated in FIG. 2, to connect the telephone 211 to either the telephone line 212 or the Telephone Set Controller 205. When telephone 211 is connected to telephone line 212, the ISB functions as a passive pass-through device. When telephone 211 is connected to telephone set controller 205, communication between telephone 211 and telephone line 212 (i.e., between telephone 211 and the outside world) passes through and is handled by the circuitry of the ISB, including telephone set controller 205, vocoder 204, microprocessor 201, modem 202 and loop start line controller 208.

Telephone 211 should preferably not be the sort of telephone which has its own power source (e.g., cordless telephone or integrated telephone and answering machine) or which manipulates its signaling (e.g., speaker phone with echo suppression technology).

Figure 2A:
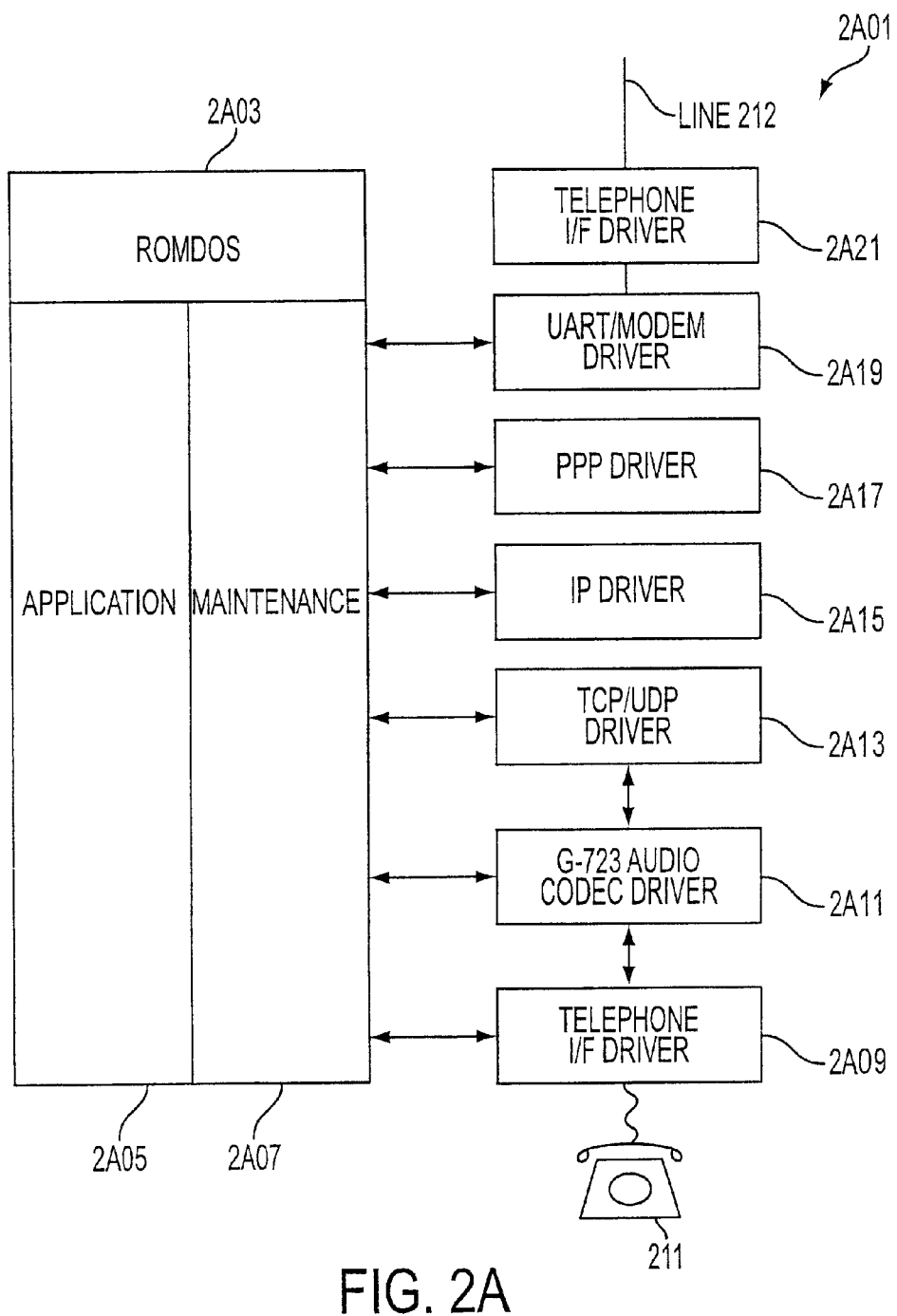
FIG. 2A shows a software architecture implemented in the hardware of FIG. 2.

Microprocessor 201 executes the software architecture shown in FIG. 2A. Software architecture 2A01 is based on a space-efficient embedded operating system such as ROM DOS 2A03, which includes application component 2A05 and maintenance component 2A07. Maintenance component 2A07 interacts with the following drivers. Telephone interface driver 2A09 allows the software to interact with telephone set 211. G.723 audio CODEC driver 2A11 interacts with maintenance component 2A07, telephone interface driver 2A09 and TCP/UDP driver 2A13. TCP/UDP driver 2A13, IP driver 2A15 and PPP driver 2A17 serve as modifiable, embedded networking software for packetizing data and allowing communication with the Internet; thus, they correspond to a Winsock driver on a conventional PC running Windows 95, 98 or NT. UART/modem driver 2A19 and telephone interface driver 2A21 allow communication with telephone line 212. ("UART" stands for "Universal Asynchronous Receiver and Transmitter" and refers to a chip used to interface a modem with the rest of the hardware of a computing device.)

The software can be a combination of commercially available software adapted for the ISB and proprietary software written specifically for the ISB. However, the ISB can use commercial, modified commercial or proprietary software or any combination.

Figure 2B:
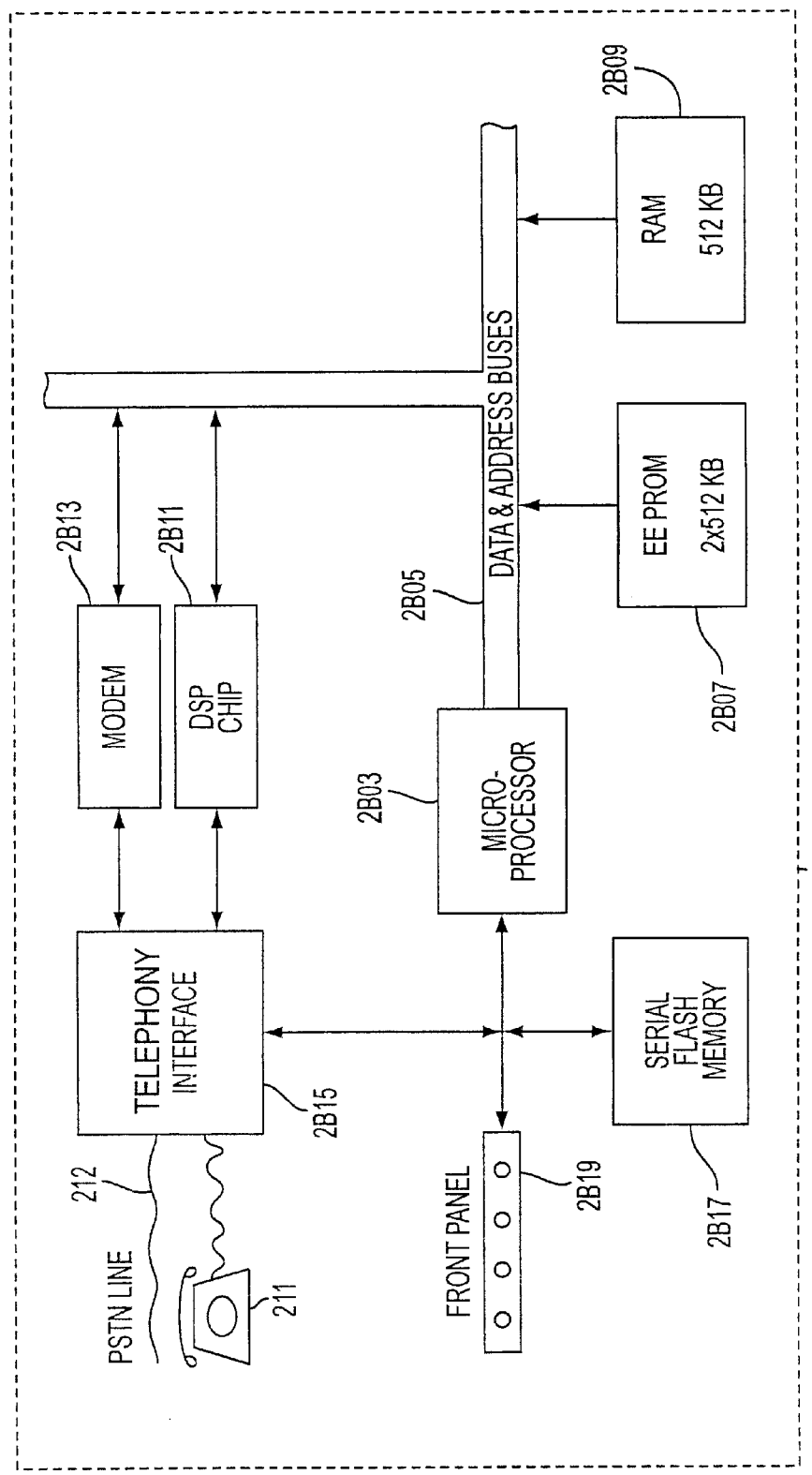
FIG. 2B shows an alternative design of an ISB.

As noted above, the hardware of the ISB can alternatively be implemented with a DSP chip. Such an alternative implementation is shown in FIG. 2B. As seen in this figure, ISB 2B01 includes microprocessor 2B03, which can be like microprocessor 201 of the embodiment of FIG. 2. Microprocessor 2B03 communicates via data and address buses 2B05 with two 512 kB EEPROM's 2B07 and a 512 kB RAM 2B09 which store the program code, data for the operation of the ISB (which will be described in detail below) and the like and provide working memory for the operation of the ISB. Microprocessor 2B03 also communicates via data and address buses 2B05 with modem or modem chip 2B13, which can be the same as modem or modem chip 202 of the embodiment of FIG. 2, and with DSP chip 2B11. DSP chip 2B11 performs compression and decompression and thus performs functions like those of vocoder 204 of FIG. 2. Modem 2B13 and DSP chip 2B11 communicate via telephony interface 2B15 with telephone set 211 and PSTN line 212. Microprocessor 2B03 also communicates with serial flash memory 2B 17, which stores device data, server data and the like, and with front panel 2B 19, which has LEDs (to be described in detail below with reference to FIG. 3) for communicating the status of the ISB to the user.

The ISB, whether constructed according to FIG. 2 or FIG. 2B, is packaged in an enclosure measuring approximately 7 inches by 7.4 inches by 1.4 inches and having slots sufficient for ventilation. A fan may also be provided if needed. The components shown in FIGS. 2 and 2B are mounted on a printed circuit board.

The hardware and software used in the ISB can be analogized in the following manner to the hardware and software of a known PC used for IT:

| Function | Known PC | ISB |
| --- | --- | --- |
| Digitize voice | Sound card | CODEC |
| Compress data | Compression algorithm executed on CPU | Vocoder or DSP chip |
| Packetize data | Winsock | portable networking software |
| ISP access | modem | modem chip |
| operating system | Windows 95, 98 or NT | ROM DOS |
| CPU | Pentium ≧ 133 MHz | Intel 80186 |
| user interface | monitor and keyboard | telephone keypad, earpiece |

Figure 3:
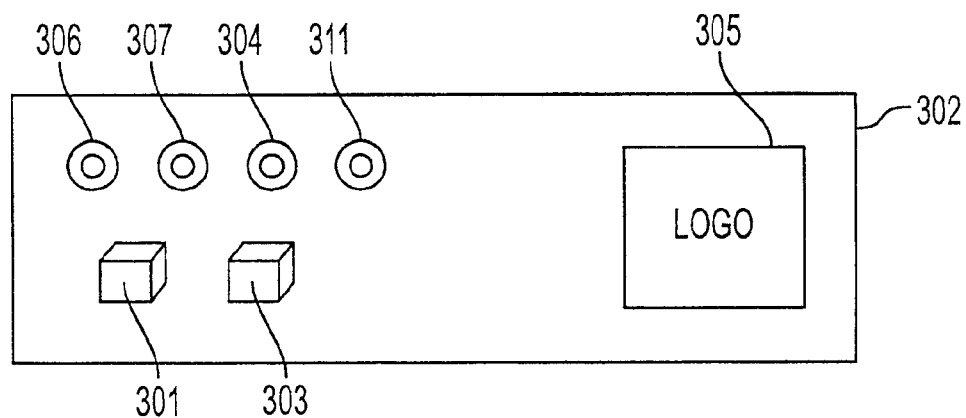
FIG. 3 shows a front panel view of the ISB.

FIG. 3 shows a front or top view of an ISB. Front or top panel 302 may include a logo 305. Status indicator LEDs 304, 306, 307 and 311 may be provided. Three of these LEDs may be used to indicate whether the power is on or off, the status of an Internet call attempt and whether any messages are waiting. The fourth can be used in various ways, such as to indicate whether the menu feature is in use or whether an upgrade to the ISB software is available (in which case the software can be upgraded in a manner to be described below). Of course, other configurations of LEDs can be used, as can other interfaces such as an alphanumeric LCD display.

Buttons 301 and 303 may be used as already described. As an alternative to the buttons, the ISB can be configured to listen to the connection from telephone 211 to detect an off-hook state of telephone 211 and to monitor the digits dialed. If the first digit dialed after the telephone is picked up is a pound sign ("#"), the ISB knows that the user wants to access the ISB's menu system. The ISB generates a voice prompt to prompt the user to select one of the following options by way of the keypad on telephone 211:

| Digit | Action |
| --- | --- |
| 1 | Reconnect or retry a call via the Internet |
| 2 | Make a new call via the Internet |
| 3 | Listen to voice messages |
| 4 | Send a voice message |
| 5 | Make an Internet test call (to test both the operation of the ISB and the ISP access) |
| 6 | Program the ISB |
| 7 | Upgrade the ISB |
| 8 | Make an off-net call |
| 9, 0 | Reserved for future use |

If the menu system is accessed in this manner, the menu button is unnecessary. Also, because making an Internet call is a menu option, the Internet button is also unnecessary. Thus, the hardware and user interface of the ISB are simplified, and the ISB has fewer mechanically actuable components to break. Once a user becomes familiar with the menu system, he need not wait for the voice prompt, but instead can simply pick up telephone 211 and dial # and an appropriate digit to perform the function desired. Also, to cancel any operation, the user can simply hang up.

To produce the voice prompts, the ISB can store sound clips in an appropriate format in memory system 202 and play them to the user through telephone 211. For example, one such sound clip can be a recording of a voice saying, "To reconnect or retry your telephone call on the Internet, press 1." Just as conventional software can be supplied in different language versions, the ISB can be supplied in different language versions with different stored sound clips.

To cancel or start over, the user hangs up. If the ISB locks up, it can be reset by unplugging and reconnecting the power supply. Alternatively, the ISB can be equipped with a reset button like those on known PCs.

Figure 4:
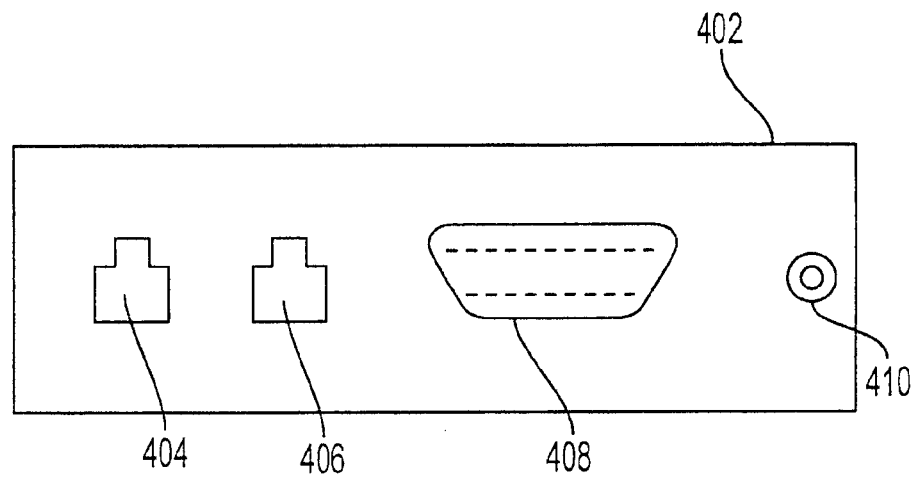
FIG. 4 shows a rear panel view of the ISB.

FIG. 4 shows the back or bottom view of an ISB. Back or bottom panel 402 can include telephone jack 404 for connection to telephone 211, telephone jack 406 for connection to telephone line 212, optional port (serial, parallel, universal serial bus (USB), etc.) 408 for connection to another device such as a PC, and power jack 410. An AC-to-DC power adapter can be plugged in to power jack 410; the cumulative effect of the AC-to-DC power adapter and the DC-to-DC power converter is to supply a +12-volt DC supply to the circuitry of the ISB. Alternatively, the ISB can contain all of the power conversion circuitry internally, in which case back or bottom panel 402 can include a power cord to be plugged directly into a wall outlet. Also, if the ISB is intended for use with a connection other than to the analog PSTN, such as a connection to an ISDN line or to a cable modem, jack 406 can be modified accordingly. Optional port 408 can be used for any operation involving an exchange of data between the ISB and some other device, such as programming and testing the ISB at the factory and for attachment to some peripheral such as a digital camera for videophone service or a caller ID unit.

It will be readily apparent from FIG. 4 and the description thereof set forth above that a user can easily install the ISB. The user simply plugs telephone 211 into jack 404, a cord from telephone line 211 into jack 406 and a power adapter into power jack 410 to supply power from a wall outlet. Once the ISB receives power, it undergoes a POST (power-on self test) routine, such as that performed by a conventional PC. During the POST routine, all LED's light up for a predetermined period of time, such as seven seconds, to inform the user that the ISB is working correctly and is in the POST routine. The ISB can also be configured to give an error beep or an error indication through the LEDs if the POST routine fails, as is also conventional in PCs. Once the POST routine is completed, the ISB enters standby mode, in which it monitors signals from telephone 211 to detect when the telephone is picked up and which digits, if any, are dialed.

The ISB includes a housing that can be desk- or wall-mounted. A premises wiring pattern and the number of telephones sharing the same telephone line will dictate the ISB's most advantageous installation.

Any or all components of the ISB which rely on code for their operation can be made software-upgradeable. For example, the modem can be software-upgradeable as modem technology advances and as standards such as the recently announced 56K standard are implemented, and the portions of the memory system containing code for the operation of the microcontroller can be software-upgradeable to allow for the H.323 Internet telephony standard. When the user issues a command to upgrade the software (e.g., by dialing # to access the menu and then by dialing 7), the ISB connects via the user's ISP and the Internet to an upgrade server to download and install the latest version of the ISB software, an operation which typically takes four to six minutes. The previous version of the software can be stored to allow the upgrade to be undone locally with no need for access to the upgrade server; to undo the upgrade, the user dials "*0#". For example, in a 512 k EEPROM, 192 kB can be used for DOS and the BIOS (basic input-output system, a set of routines which allow a microprocessor to communicate with other hardware), 384 kB for the current version of the application software, 192 kB for a scratch buffer, and 384 kB for the previous version of the application software. At the factory, the IS B is provided with two copies of the same version of the software; one of these copies is overwritten in the first upgrade, while the other is available to undo the first upgrade. Some upgrades may require assistance from the help desk (to be described below), such as those allowing new extra-cost features.

Each ISB stores information regarding that ISB. Such information can include all information necessary for connecting to the Internet (e.g., telephone number, user I.D. and password for logging onto the ISP). The information can also include a record of other ISBs with which the ISB has interfaced, including data for each other ISB such as the telephone number and the static IP address if any. The oldest and least used entries can be purged periodically.

More specifically, the ISB stores device, server, billing, and owner information and a friends directory. The device information is typically programmed into the ISB at the factory and includes the serial number, the manufacturing date, the hardware version, the software version, and the feature key, which identifies those features which the ISB implements. The server information includes the IP addresses for the various servers which the ISB needs to access, such as the primary and backup ISBSSs. The owner information includes the telephone number, the ISP access telephone number, any scripting required to log onto the ISP, logon name and password, the domain names or IP addresses for the SMTP and POP servers for e-mail, the e-mail address, and the e-mail password. The SMTP server implements the simple mail transfer protocol (SMTP) for sending e-mail, while the POP server implements the post office protocol (POP) for receiving e-mail. Many ISPs use the same server for both protocols. Other mail protocols exist and can be used instead. The server and owner information can be programmed locally by the user or over an Internet connection by an agent at a help desk, which is described in detail below. The friends directory is maintained automatically and in run-time and has a data structure like that shown in the following table:

| Record # | Serial # | Telephone # | E-mail address | Counter |
|---|---|---|---|---|
| 1 | 100011 | 202-555-0102 | hisname@someserver.com | 25 |
| 2 | 100021 | 703-555-0103 | hername@anotherserver.edu | 11 |
| *** | *** | *** | *** | *** |
| 99 | *** | *** | *** | *** |

The counter is increased by one for each conversation with a particular person. When the number of entries to be stored in the friends directory exceeds the number of allowable entries, the entry with the lowest counter can be erased. Alternatively, the time and date of the last conversation can be stored, and the entry whose last conversation has the earliest time and date can be erased.

Figure 5:
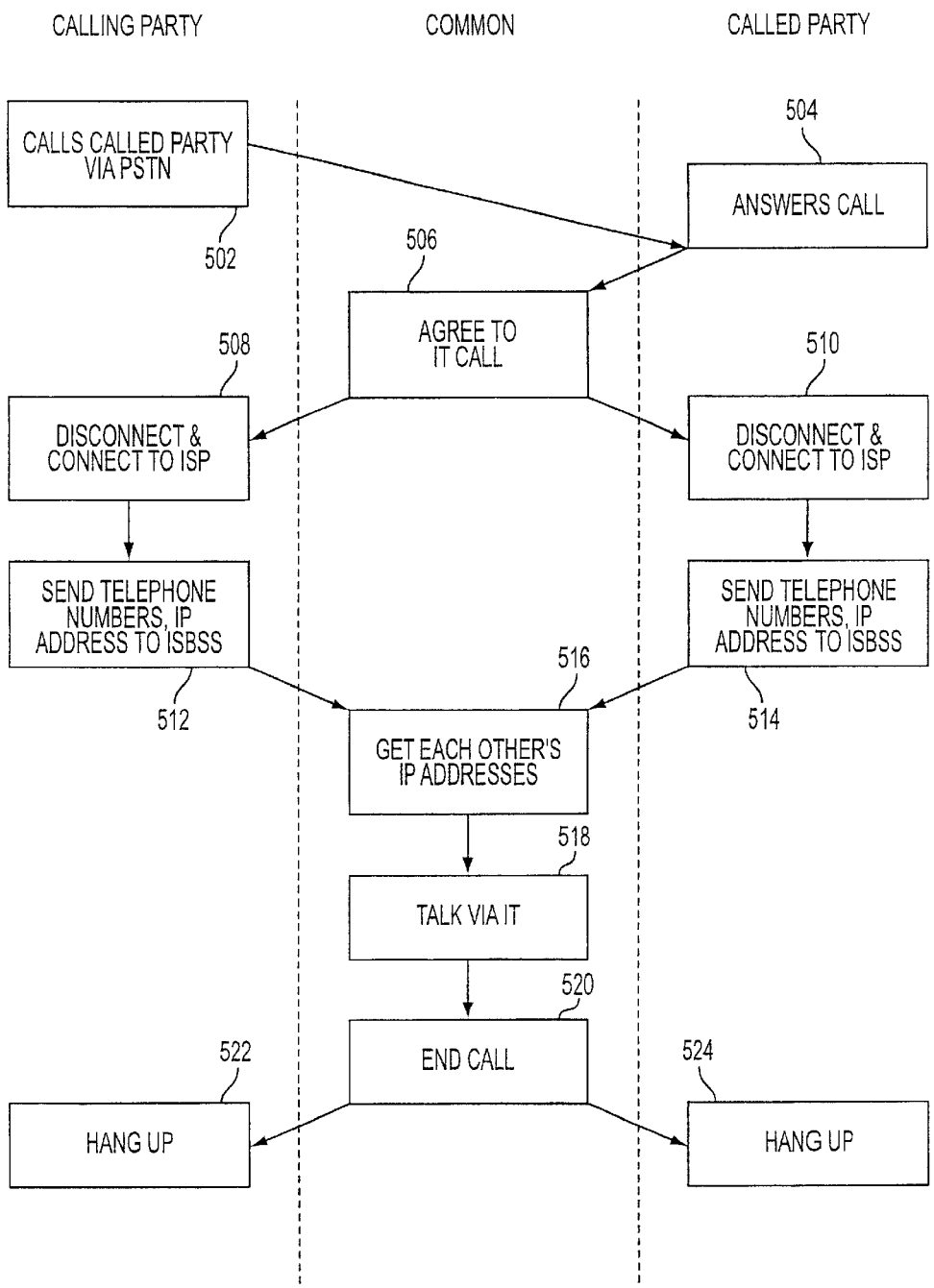
FIG. 5 shows a flow chart of the steps involved in placing a call between two ISB users.

The steps carried out by both parties in placing an IT call using two ISBs are shown in the flow chart of FIG. 5. The calling party calls the called party via the PSTN in step 502, and the called party answers in step 504. In step 506, the parties agree to switch to an IT call, and in steps 508 and 510, each party's ISB disconnects (hangs up on the PSTN connection) and connects to that party's ISP. In steps 512 and 514, each party's ISB sends the calling and called telephone numbers and that ISB's IP address to the ISBSS. In step 516, each party gets the other party's IP address from the ISBSS, and in step 518, the parties talk via IT. The call is ended in step 520, and the parties hang up in steps 522 and 524.

Figure 6:
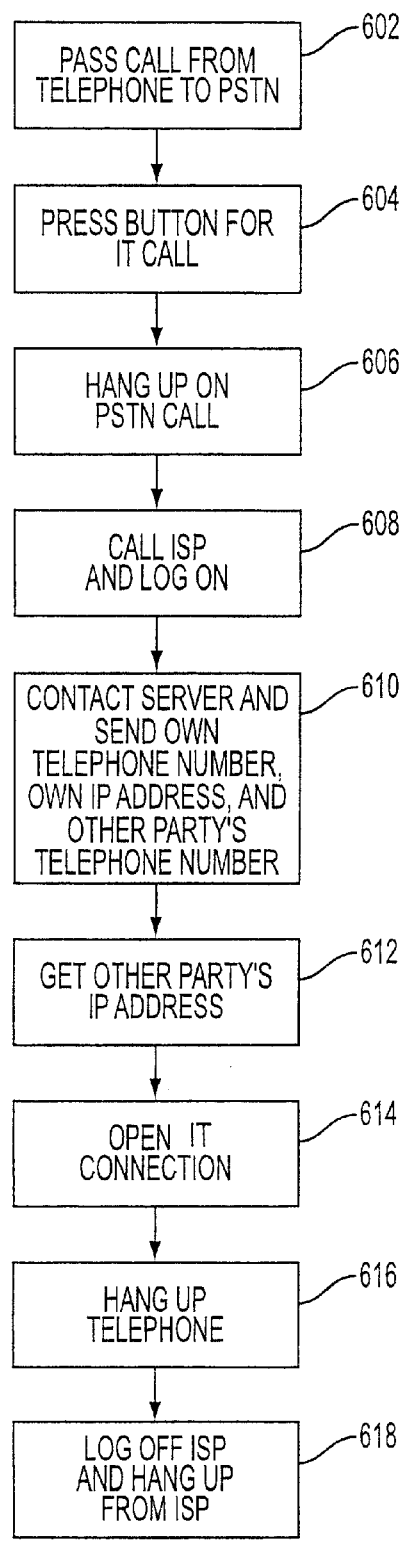
FIG. 6 shows a flow chart of operations performed by one of the ISB's during the call of FIG. 5.

During the call shown in FIG. 5, each party's ISB operates as shown in FIG. 6. In step 602, the ISB acts as a passive conduit for passing the call from the telephone to the PSTN. In step 604, the user presses the button to switch to an IT call. In step 606, the ISB hangs up on the PSTN call, and in step 608, the ISB calls the user's ISP and logs on. In step 610, the ISB contacts the ISBSS and sends the calling and called telephone numbers and that ISB's IP address. In step 612, the ISBSS sends the ISB the IP address of the other party's ISB, and the ISBs open an IT connection in step 614. In step 616, the user hangs up the telephone, and in step 618, the ISB logs off the ISP and hangs up from the telephone connection to the ISP.

A technique called "double packets" can be implemented to improve voice quality. In this technique, every packet is sent twice. Thus, if packets are dropped or sent out of sequence, voice quality will most likely not suffer. Packet dropping and out-of-sequence packet transmission are usually not a problem when the users' ISPs communicate over a common backbone or over backbones which have a peering arrangement (i.e., freely transmit packets over each other's facilities). However, if the two ISPs communicate over an NAP (network access point), packet dropping and transmission out of sequence are problems, which double packet transmission corrects.

There is a special kind of call known as a self-test call. When the user dials #5, the ISB initiates a call to a call completions server via the user's ISP. If the call is completed correctly, the user hears a recording from the call completions server to that effect. Otherwise, the user knows that there may be a problem with the ISB.

To implement the functionality noted above, the ISB can perform any of several calling operations: passive operation, establishing a connection to the ISP, PTIC (PSTN-to-Internet calling), MMIC (meet-me Internet calling), checking messages, sending messages, etc. These calling operations will now be explained with reference to FIGS. 7A–7E and 8.

Figure 7A:
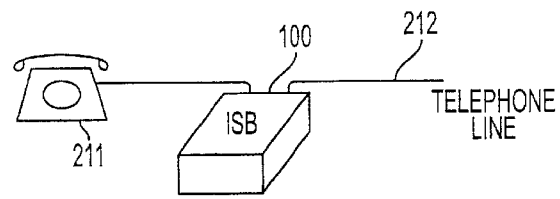
FIGS. 7A–7E show the connections between one or more ISB's and other telephony components during various calling operations.

Passive operation will be explained with reference to FIG. 7A, which shows ISB 100 connected between telephone 211 and telephone line 212. In this operation, the ISB monitors the off-hook status of the telephone and the dialed digits via the connection to the telephone. Via the connection to the telephone line, the ISB monitors ring signals (incoming calls). If the first dialed digit is the pound sign ("#"), the ISB allows the user to control it via the menu system. Because IT is invoked through the menu system (and more specifically by dialing "#1"), IT is not invoked unless the first dialed digit is a pound sign. If more than six digits are called, the ISB operates as a PTIC caller, to be explained below, while if a ring signal is received from the telephone line, the ISB operates as a PTIC called party, to be explained below. Once the telephone is placed on-hook, all operations of the ISB are reset except the mode and the digit buffer.

Figure 7B:
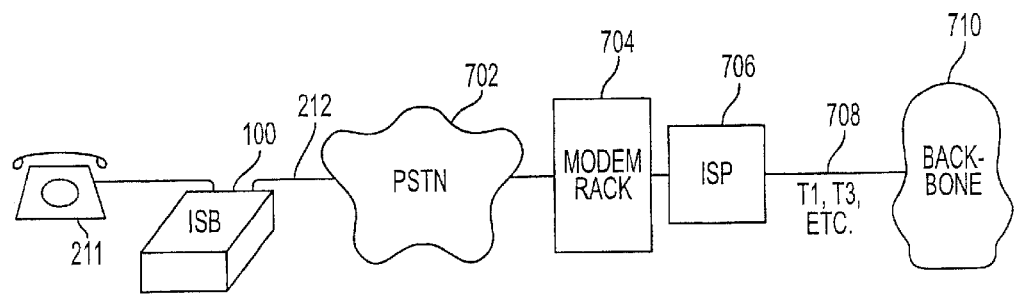

Connection to the ISP will now be explained with reference to FIG. 7B. The modem is initialized and telephone line 212 is monitored for a dial tone. ISB 100 dials the ISP access number to connect via PSTN 702 to modem rack 704 of the ISP. The modem of the ISB and a modem reached in modem rack 704 negotiate the baud rate and the protocol, whereupon ISB 100 is connected to the facilities of ISP 706. The ISB and the ISP perform any authentication procedure required, and the ISB selects "PPP"from the ISP's logon menu, if any. The ISB and the ISP then start communication by PPP, and PAP (the password authentication protocol) is carried out if no authentication has been performed before. The ISB is then connected by TCP to the ISP and thus via line 708, such as a T1 or T3 line or the like, to Internet backbone 710. If the call to the ISP results in a busy signal, the user can simply wait and call again. Alternatively, the ISB can be configured to store and dial multiple access numbers for one or more ISPs.

In case a user's ISP requires a special logon procedure, the ISB can have a scripting facility. This facility allows the ISB to store a logon script and to play the script to satisfy the ISP's logon requirements. The scripting language can be the same as that used for dial-up networking in Microsoft Windows 95, which is known in the art and will therefore not be explained here.

The script can be supplied to the ISB in different ways. For example, the user can compose the script on a PC and transfer the script to the ISB over a serial connection, or the agent at the help desk (to be explained in detail below) can remotely program the script into the ISB. Alternatively, the ISB can store a boilerplate script with various components which can be enabled or disabled remotely by the agent. Still another way of programming the script into the ISB is to log on manually, while the ISB is connected to a PC over a serial connection, and to issue a command to automate the logon, as certain terminal emulation programs do. In any event, it should be possible to allocate 1,024 bytes in memory to store any script.

Figure 7C:
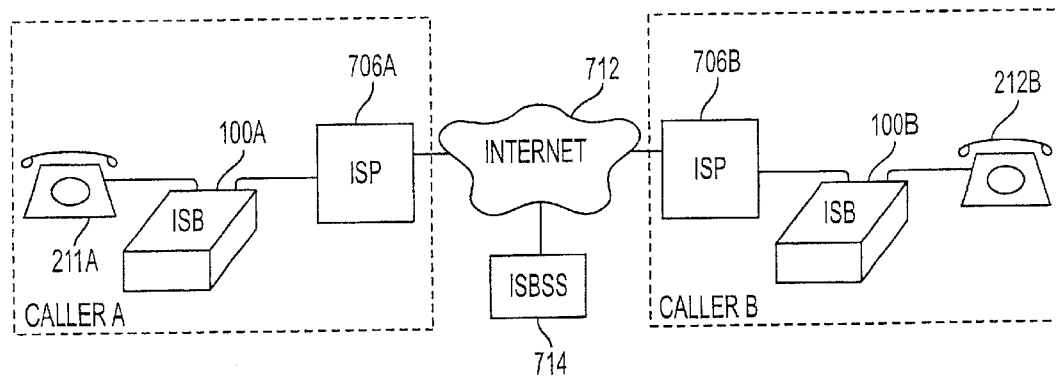
Figure 8:
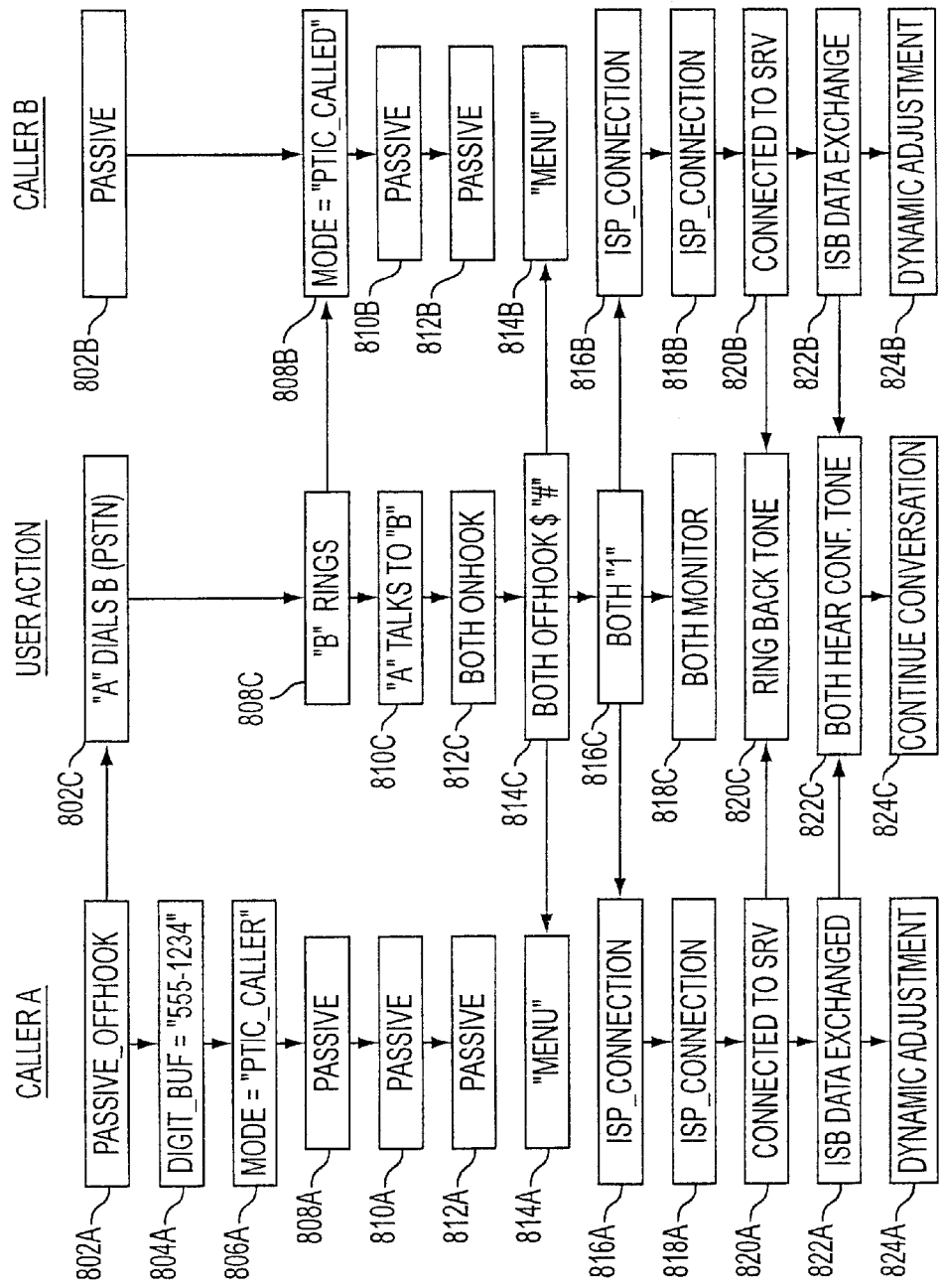
FIG. 8 shows a flow chart of the operational states assumed by the ISB's during a PSTN-to-Internet call.

The operation of making a PTIC call will now be explained with reference to the diagram of FIG. 7C and the flow chart of FIG. 8. In FIG. 8, operational steps or states occurring at the same time are indicated by the same reference numeral, except suffixed by A (caller A's state), B (caller B's state) or C (user actions or common states).

Caller A uses telephone 211A, ISB 100A and ISP 706A, while caller B uses telephone 211B, ISB 100B and ISP 706B. Once the PTIC call is completed, they communicate over Internet 712, generally after communication over the Internet with ISBSS 714.

At the time at which user A dials user B in step 802C, user A's ISB is passive and off hook (step 802A), while user B's ISB is passive (step 802B). As user A dials, his ISB records the digits dialed in the digit buffer in step 804A and enters "PTIC caller" mode in step 806A. Then, in step 808A, user A's ISB becomes "passive," i.e., acts as a passive pass-through between user A's telephone set and the PSTN. In step 808C, user B's telephone rings, and in step 808B, user B's ISB goes into the "PTIC called" mode. User A talks to user B in step 810C, and once they agree to an IT call, they both hang up in step 812C. During these operations, their ISBs are "passive" (steps 810A, 810B, 812A, 812B). They both pick up their telephones and dial # in step 814C, whereupon their ISBs go into menu mode in steps 814A and 814B. They both dial 1 in step 816C to initiate ISP connections in steps 816A and 816B. While they both monitor (listen for the ring-back tone) in step 818C, their ISBs remain connected to their ISPs in steps 818A and 818B. The ISBs connect to the ISBSS in steps 820A and 820B, and the users hear ring-back tones in step 820C. The ISB data are exchanged in steps 822A and 822B, and the users hear a confirmation tone in step 822C. While the users continue their conversation in step 824C, the ISBs undergo dynamic adjustment in steps 824A and 824B. If either user's ISP drops that user's connection, that user can simply dial #1 again to be reconnected to the ISP and thus to the other user.

Dynamic adjustment will now be described with reference to FIG. 8A. Dynamic adjustment starts in step 8A02. In step 8A04, the first hundred packets (about one-third of a second) are monitored to determine transmission quality. More specifically, the baud rate and the percentage of dropped packets are measured. In response to these measurements, it is determined in step 8A06 whether one or more of the following need to be adjusted to maximize transmission within the bandwidth provided by the baud rate: the degree of compression (e.g., 6.3, 5.3, 4.8 or 4.1 kB/sec), the packetization (number of frames per packet, from one through five, which is also a measure of delay) and whether double packet transmission is turned on or off. For example, if the baud rate is 14.4 kilobaud and the percentage of dropped packets is below 10%, the ISBs may be adjusted to 6.3 kB/sec, two frames per packet and no double packets. At the same baud rate and a percentage of dropped packets of 10% or more, the ISBs may be adjusted to 4.1 kB/sec, five frames per packet and double packets. If the connection rate is greater than 16 kB and the rate of lost packets is 10% or less, the ISBs are adjusted to 6.3 kB/sec compression, one frame and no double packets; at the same connection rate and a higher rate of lost packets, the number of frames is increased, and double packets are used. The ISBs may implement this dynamic adjustment through a look-up table in the software; i.e., every combination of the baud rate and the percentage of dropped packets will correspond to a previously calculated and stored set of settings. For example, the look-up table is consulted in step 8A08, and the adjustment is made in step 8A10. Alternatively, calculation of the settings may be done on the fly. Once the adjustment is made, or if no adjustment is required, the dynamic adjustment ends in step 8A12. The ISB can be configured to abort the connection or any operation if the baud rate is less than 14.4 kB.

Figure 8A:
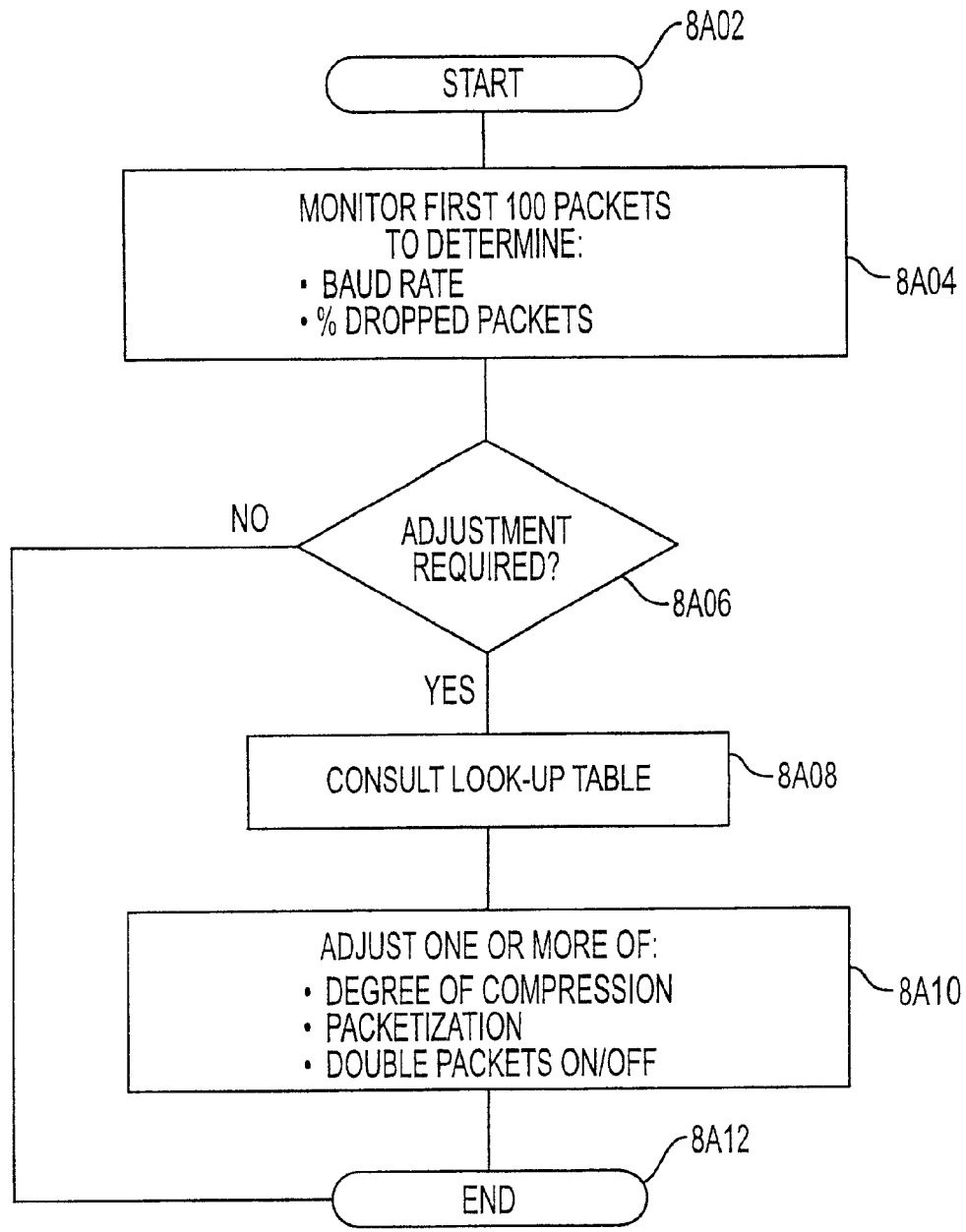
FIG. 8A shows a flow chart of the dynamic adjustment performed during the Internet phase of a telephone call.

The hardware shown in FIG. 2 or 2B can be used to implement the dynamic adjustment of FIG. 8A. For example, the modem can detect the baud rate in a known manner, while the look-up table can be stored in whatever memory is provided (RAM, EEPROM, etc.), and the microprocessor can perform the remaining operations.

The ISB can be configured to give the following error messages, which can be used by either a user or a technical support person to determine why a call has not been completed normally:

| Error code | Problem |
| --- | --- |
| 0 | No dial tone |
| 1 | ISP busy |
| 2 | ISP did not answer |
| 3 | Logon failed, no logon prompt |
| 4 | Logon failed, no password prompt |
| 5 | Insufficient baud rate |
| 6 | PPP authentication failed |
| 7 | PPP failed |
| 8 | PPP timed out |
| 9 | Server did not connect |
| 10 | Server did not respond |
| 11 | Server rejected transaction |
| 12 | Reception terminated |
| 13 | Transmission terminated |
| 14 | Number not programmed |
| Error codes 20–24 refer to sending a voice mail message, to be described below. | |
| 20 | DNS did not answer |
| 21 | SMTP address wrong |
| 22 | SMTP user ID wrong |
| 23 | SMTP rejected message |
| 24 | SMTP disconnected |
| Error codes 30–34 refer to receiving a voice mail message, to be described below. | |
| 30 | DNS does not answer |
| 31 | POP address wrong |
| 32 | POP user ID/password wrong |
| 33 | POP stopped sending |
| 34 | POP disconnected |
| Error codes 40–42 refer to user programming of the ISB through the telephone keypad. | |
| 40 | Character not defined. |
| 41 | Character entered is not permissible where entered. |
| 42 | Too many characters. |

The error codes can be given to the user in the form of voice prompts. For example, if there is no dial tone, the ISB can play a first sound clip of a voice saying, "I'm sorry, but there is a problem with your Internet access; please try again. Error code . . . " and a second sound clip of a voice saying, "zero." The user can consult the manual to find the significance of error code 0. In the case of errors which require a call to technical support, the user can make a note of the error code.

Variations on the PTIC call avoid incurring PSTN charges at all. Such variations include a previously agreed-upon signal that a particular person is calling, such as letting the telephone ring twice and then hanging up, and letting the telephone ring just long enough for caller ID information to be sent and then hanging up. The users then call each other back over the Internet as for a meet-me Internet call, which will now be described.

The MMIC, or meet-me Internet call, is a simplified version of the PTIC. In the MMIC, the users have previously agreed to call each other at a certain time, so no PSTN handshaking is required.

In the MMIC, both users dial #2 to access MMIC operation in their ISBs via the menu. User A enters user B's number, which user A's ISB verifies in its directory, and user A's ISB enters MMIC-caller mode. User B enters user A's number, which user B's ISB verifies in its directory, and user B's ISB enters MMIC-called-party mode. The rest of the conversation proceeds as for a PTIC call, i.e., steps 814A–C to 824A–C in FIG. 8.

Once two users have already called each other using the ISBs or otherwise added each other to their friends databases, MMIC can be used with a speed-dialing technique in which a user dials the last six digits of the other user's telephone number followed by #, regardless of where in the world the other user is, thereby avoiding long and confusing digit sequences for conventional international dialing. The ISB then matches the dialed last six digits with the friends data stored in the ISB to identify the other ISB which is to be called.

The last six digits can be used for a unique identification of up to a million other ISBs. While it is possible that a user's friends database will contain two entries having the same last six digits, this possibility is remote. Even if such a situation does arise, the ISB can be configured to prompt the user to dial more digits to identify the called party uniquely.

Figure 7D:
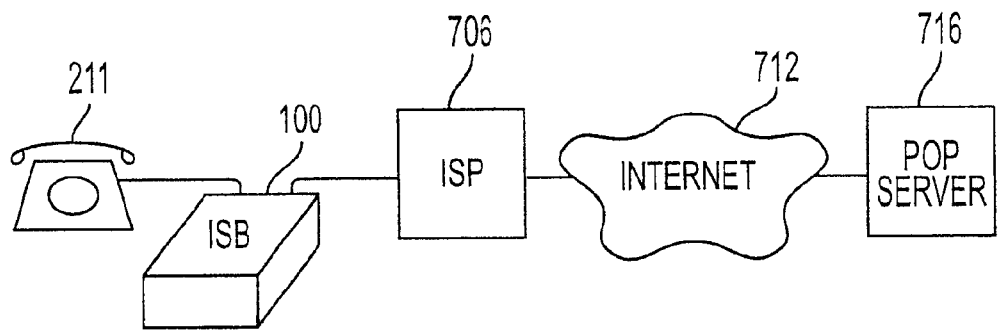
Figure 7E:
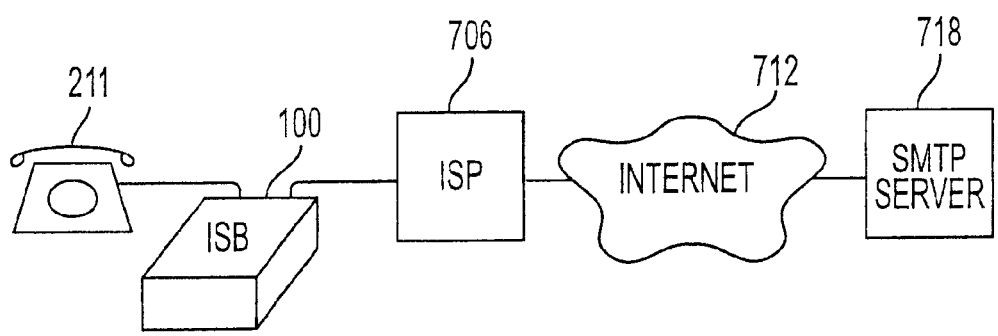

Checking and sending messages will now be explained with reference to FIGS. 7D and 7E. To check messages, the user dials #3 to enter message checking through the menu. The ISB connects to the ISP and then connects through ISP 706 and Internet 712 to POP server 716. Once this last connection is achieved, the ISB downloads and plays the first message. The user can then dial 1 to repeat, 2 to go to the next message or 3 to erase a message, much as he would with an answering machine. To send a message, the user dials #4, whereupon the ISB connects to the ISP and then connects through ISP 706 and Internet 712 to SMTP server 718 (the function of the SMTP server having been described above). The user can then record a message and then send it via the SMTP server to the recipient's e-mail address. The ISB can be configured to impose a time limit on outgoing messages (e.g., 60 seconds). The ISB can also be configured to poll the ISP periodically (e.g., four times a day or some other interval which is either set in the factory or programmed by the user) to check for message and to give an indication to the user via an LED or the like when messages are waiting.

The ISB can also be configured to poll the ISP periodically (e.g., four times a day or some other interval which is either set in the factory or programmed by the user), whenever a call is completed over IP, or both to check for message and to give an indication to the user via an LED or the like when messages are waiting. In one configuration, polling takes place only when all three of the following conditions are satisfied: (1) the polling period set in the ISB has expired, (2) the telephone has not been in use in the last two minutes and (3) no ring signal has been received in the last two minutes. Of course, the ISB can be equipped with an internal clock, such as those used in conventional IBM-compatible PCs, to allow periodic polling.

Each voice mail message is stored on the recipient's POP server in the form of an e-mail message with the sender's e-mail address listed in the "From:" field, a standard subject such as "ISB voice mail message" and a MIME attachment of the voice mail message in an appropriate sound file format. If the recipient checks his e-mail on the POP server with a conventional e-mail program such as Eudora, he will see such message interspersed among conventional e-mail messages. The ISB can distinguish the voice mail messages from the conventional e-mail messages by the subject.

The ISBSS will now be described in detail. The functionality described for the ISBSS can be implemented on a Sun Microsystems workstation running Solaris 2.6 or on any other sufficiently powerful computing device running an appropriate operating system. The server program executed by the ISBSS can be written in C++ or in any other suitable language. The primary purpose of the ISBSS, but not the exclusive function, is to provide connection information for two ISBs to engage in an IT call, since it is contemplated that the ISBs will not exchange information during the PSTN portion of the call. In addition, the ISBSS documents each completed call and each request for any other service, such as voice messaging and software in upgrade requests, requested from ISBs and supported by the vendor of the ISBs.

The ISBSS is an iterative server. The server functions can be implemented in a single process and do not require threads. Each IT call involves two connections to the ISBSS, one from each of the ISBs. Each connection is kept open at most 200 msec after the three-way handshake is complete. The ISBSS software makes no blocking calls to any kernel function unless the ISBSS software is completely idle. In any connection to the ISBSS, there is one datagram sent in each direction.

The ISBSS provides service to the users of the ISBs by facilitating an exchange of IP addresses between two ISBs whose users want to communicate with each other. It does so by accepting a TCP connection request from each client, matching corresponding connection requests and sending the IP address of one of the ISBs to the other ISB. Otherwise, the ISBs might have to communicate their IP addresses to each other during the PSTN phase of the call. Such a procedure would require the modems of the ISBs to be set twice, once for the PSTN phase of the call and once for the IT phase of the call, and would render the MMIC call impossible. The use of the ISBSS allows the ISBs to set their modems only once, for the IT phase of the call, and makes the MMIC call possible.

The operation of the ISBSS will be described with reference to the flow chart of FIG. 9A. In steps 9A02 and 9A04, each ISB sends the ISBSS a connection request, which is a data string including the following: that party's serial number, the other party's serial number, that party's telephone number, the other party's telephone number, that party's IP address, version number and the like. For a PTIC, the calling party's telephone number is not required. The ISBSS searches for a match between the ISB and a waiting list of ISB's. If there is no match, as in step 9A06 (where caller A's request has been received first), the ISB is appended to the waiting list or queue in step 9A08 and is instructed by the ISBSS to expect a call from another ISB. If there is a match, as in step 9A10 (where caller B's request has been received second), the ISB matches the requests in step 9A12 to find the IP address of the other party's ISB in step 9A14. In step 9A16, the ISBSS forwards caller A's IP address to caller B's ISB, and in step 9A18, caller B's ISB attempts to contact caller A's ISB using the thus obtained IP address, whereupon the ISBSS has no more involvement in the call. Thus, when two parties want to call each other, the first received connection request is queued, and the second received connection request is answered with the IP address of the first received request.

By holding connection requests in a data structure in this manner, the ISBSS can avoid holding open a TCP connection to any particular ISB for more than a few microseconds, thus reducing load on the ISBSS. In fact, the ISBSS can break the TCP connection immediately upon receiving the connection request.

The ISBSS can also send commands to an ISB while processing a connection request. Such instructions can, for example, instruct the ISB to modify the friends data or other data stored locally in the ISB.

As the number of ISBs in use increases, more ISBSSs can be added. Multiple ISBSSs can coordinate their services; for example, an ISBSS can send an instruction to an ISB if the connection request should be made to another ISBSS.

The ISBSS stores telephone numbers in BCD (binary coded decimal) notation with the least significant digit of the telephone number stored in the most significant nibble (four bits) of the first byte (8 bits) of the telephone number string. With this approach, the ISBSS can allow the possibility of six-digit dialing to any ISB in the world. The code to implement this feature is shown in FIGS. 10A and 10B.

Figure 11:
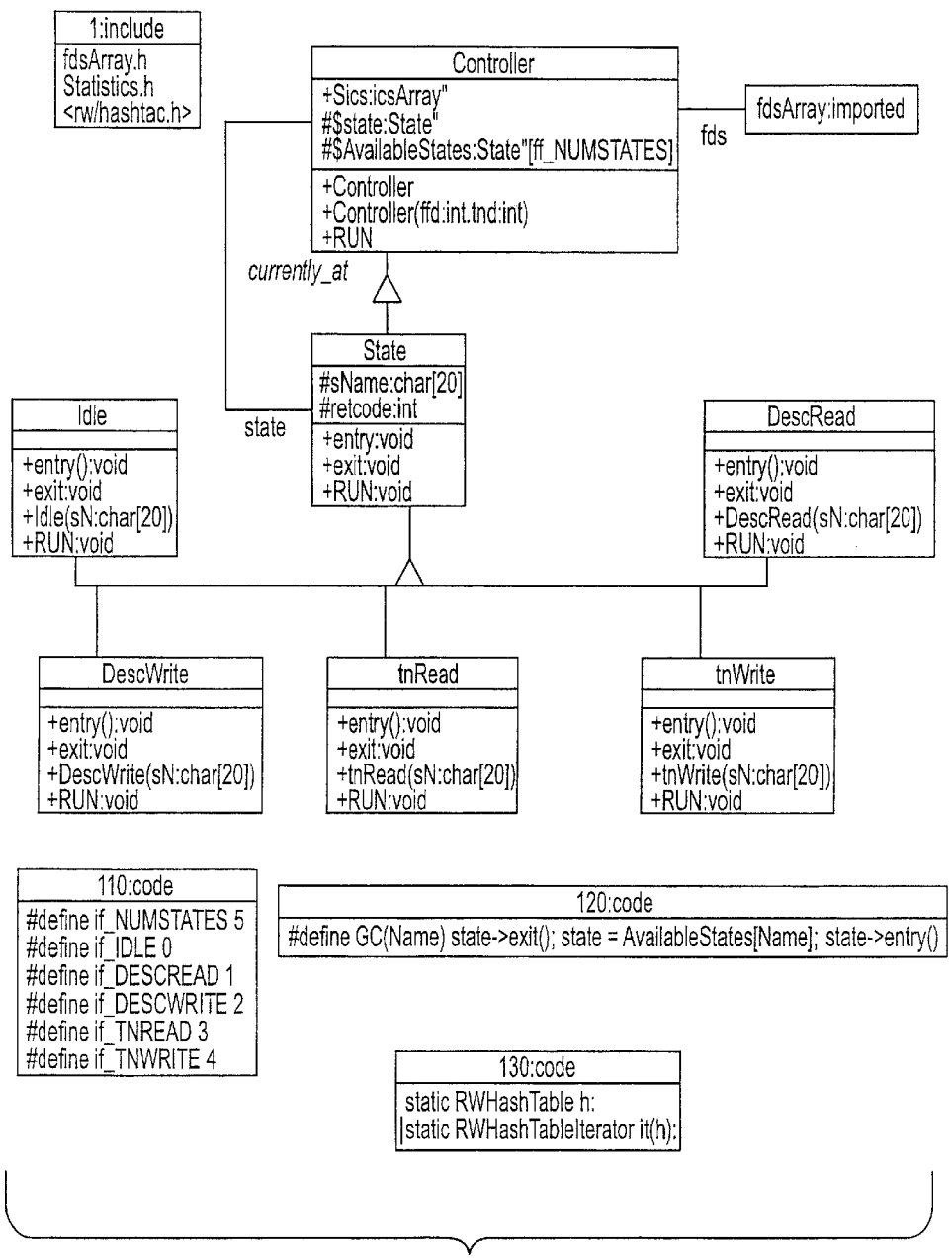
FIG. 11 shows a state diagram of the ISBSS.

A state diagram of the ISBSS is shown in FIG. 11. The basic design of the ISBSS software is that of a finite state machine. The states in the machine are prioritized such that if conditions allow the ISBSS to enter more than one state simultaneously, the higher priority state is entered first. After completing work to be done in any given state, the machine always returns to the "idle" state. The states are listed below, with a priority number of each state; a higher number indicates a higher priority.

Idle (0): The default state, in which the ISBSS does housekeeping on its internal data structures while waiting for requests for service which would send it into some other state.

ISB Connection Request (4): The ISBSS enters this state after completion of a three-way handshake. The ISBSS accepts all pending connection requests at this time.

ISB Connection Read (5): The ISBSS enters this state when a particular connection has data ready to be read by the ISBSS. The data are read, verified and processed. The need to write the given connection is announced.

ISB Connection Write (6): The ISBSS enters this state only when a particular connection is ready to write the single datagram which the ISBSS writes to each connection. The write takes place, and the disconnect timer is set to expire in a predetermined time, such as 200 msec.

ISB Connection Disconnect (7): The ISBSS enters this state only when the disconnect timer expires for a particular connection. The ISBSS aborts the connection and frees up any space used to maintain the connection.

Telnet Connection Request (1): In addition to serving ISB requests, the ISBSS has a Telnet-like interface for issuing commands to the ISBSS. The ISBSS enters this state only when the listening service indicates that a request for connection has been completed. Only one such Telnet connection is permissible at a time. Each new request results in a dropping of the previous request. The commands include -A to set a parameter (such as the connection list time out in seconds and the billing file size in records, with the syntax being -A parametername newvalue), -B to dump the billing file, -C list to list the commands currently available, -C set (actual command) to send that command to all connection requests, -H for help, -L for a parameter list, -M n to monitor for n minutes if n>0 or to turn off monitoring if n=0, -Q (password) to quit, -T on or -T off to turn testing on or off, and -V (serial number) (status) to add the given serial number to the list of invalid serial number if (status) >0 or to remove the given serial number from the list of invalid serial numbers if (status)=0.

Telnet Connection Read (2): The ISBSS enters this state only if a command has been received on the Telnet connection and is ready to be read.

Telnet Connection Write (3): Everything which needs to be sent to the Telnet connection is buffered asynchronously in a message list. The ISBSS enters this state and sends a single message if the message list is not empty.

In a connection with an ISB, the ISBSS receives a connection data structure and sends a response data structure. The connection data structure is shown in FIG. 11A, wherein the tx_data array has a structure shown in FIG. 11B and the tx_BillingData structure is shown in FIG. 11C. The response data structure is sent to every connecting ISB unless the incoming datagram is incorrect and has a structure shown in FIG. 11D, wherein the tx_data array has a structure shown in FIG. 11E.

The ISBSS is able to monitor its own behavior over a specified range of any number of minutes. The number of minutes is specified by a Telnet command described above. The output of the monitoring process is shown in an illustrative example in FIG. 11F. The data shown in FIG. 11F show the number of connection requests and the manner in which they were processed.

The ISBSS is also able to maintain a log of any errors or suspect situations which arise in running the server program. A sample log file is shown in FIG. 11G.

While it is contemplated that the ISBSS will be a public server accessible to all ISB users, it is also possible that an ISBSS will be supplied, either as a workstation with the software installed or as software for installation on a separately supplied workstation, to an organization which wishes to maintain its own dedicated ISBSS to supply connection information to ISBs within that organization. The ISBs can be programmed to use this dedicated ISBSS for calls within the organization or a public ISBSS for other calls, which are called off-net calls and initiated by dialing #8. Off-net calls can also be made by users of the public ISBSS to call one another via a backup ISBSS when their usual ISBSS is down and automatic reroute routines fail.

MMIC calls are treated similarly to PTIC calls. In MMIC calls, it does not matter which ISB is the calling ISB and which is the called ISB, so that the ISBSS can assign these roles arbitrarily. In an MMIC call, the users may not coordinate the time of their call properly, in which case the calling party's request remains in the queue in the ISBSS. Either the ISB or the ISBSS can be configured to wait a certain period of time and request via a voice prompt that the user try the call again later.

In sending voice mail, the ISBSS has no involvement beyond sending a "Go ahead and send your voice mail" message, whereupon the ISBSS disconnects. In the Internet test call, the ISBSS disconnects after sending a "test complete" message.

The ISBSS can be used to program the ISB automatically as needed. The ISBSS uses the same commands which would be used to program the ISB from a PC over a serial connection. The ISBSS programs server information, e.g., the ISBSS's IP address and the feature key.

Another use of the ISBSS is to notify a customer that an upgrade is available. Whenever the ISB contacts the ISBSS, the ISBSS can supply the current software version number, which is compared with the version number of the software in the ISB. If the current version number is higher, an LED lights up on the ISB to inform the customer of the availability of the upgrade. The ISBSS supplies the ISB with the IP address of the upgrade server from which the upgrade is available and then disconnects.

In the programming and upgrade notification operations just described, the ISBSS can send the following commands to the ISB:

"Turn on the 'upgrade available' LED."
"Use the accompanying IP address as the new address for the main ISBSS."
"Use the accompanying IP address as the new address for the backup ISBSS."

The ISBSS can also reject a connection request, for example, if a caller's bill is sufficiently overdue, if the serial number or telephone number in the connection request is invalid, or if the ISBSS lacks memory or process time. When an ISB's attempt to contact the ISBSS fails three times, the ISB assumes that the ISBSS is not functional and tries to connect to a secondary ISBSS.

Each connection to the ISBSS is accompanied by data describing the service most recently completed by the connecting ISB (usually about the most recently connected telephone call before the current call request). Such data are written to a log file for future processing.

Other servers besides the ISBSS can be used. For example, a backup ISBSS can be added and can become active when the main ISBSS fails or passes control. Also, auxiliary servers such as an upgrade server, an inquiry server, an H.323 server, a commercial server and the like can be used.

A particular server which can be used with the ISB system is called a billing server. The billing server maintains information regarding each completed IT call for billing purposes. The ISBSS can supply this information to the billing server. The billing record for each call includes the caller telephone number, the caller serial number, the called telephone number, the called serial number, the start time and date, the call duration and the quality of the connection. To determine the quality of the connection, the billing server or another server can maintain a statistical record, either globally or for each call. The statistical record can include such information as the percentage of lost packets, the percentage of late packets, the percentage of packets out of sequence, the percentage of discarded transmission packets, the percentage of discarded reception packets, and, for each of the parties to the call, the baud rate, the compression rate, and the frames.

The billing information is collected for all different transactions of an ISB. To make this process more efficient, the billing information about a transaction is passed to the billing sever at the beginning of the next transaction.

The ISB generates a billing record as follows. When the ISB contacts the ISBSS for a transaction, the ISB receives the current time from the ISBSS and produces a partial billing record which includes the start time and the telephone number of the other party (the latter field being left blank when it is inapplicable, e.g., when checking messages). At the end of the transaction, the ISB adds the duration to the partial billing record to produce a complete billing record, which is provided to the billing server at the beginning of the next transaction.

A feature which a company selling ISBs can provide to enhance the functionality of the ISBs is called the "help desk." Through the help desk, customer service agents can assist customers by remotely programming their ISBs, answering questions about the service, upgrade the software in the ISBs, etc.

Figure 9:
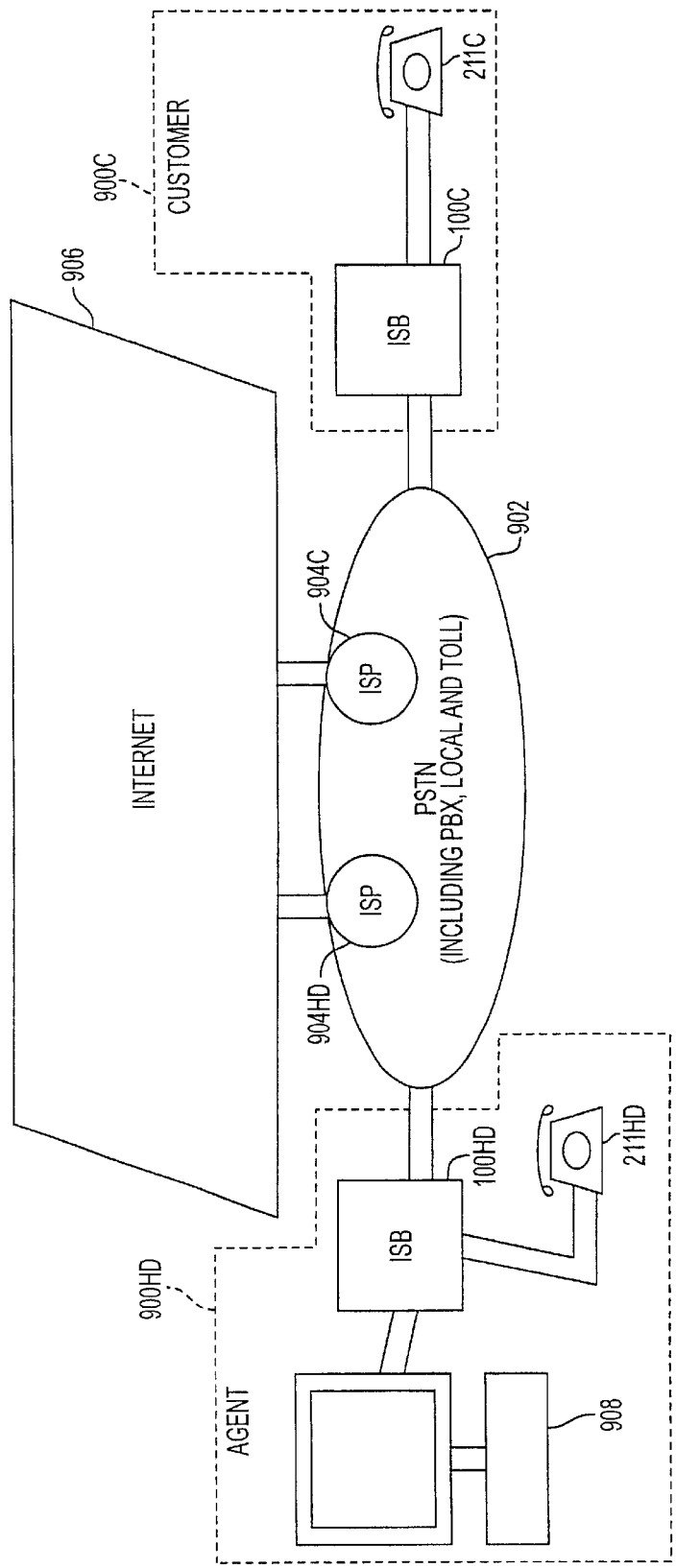
FIG. 9 shows a connection between an ISB and a help desk.
Figure 9A:
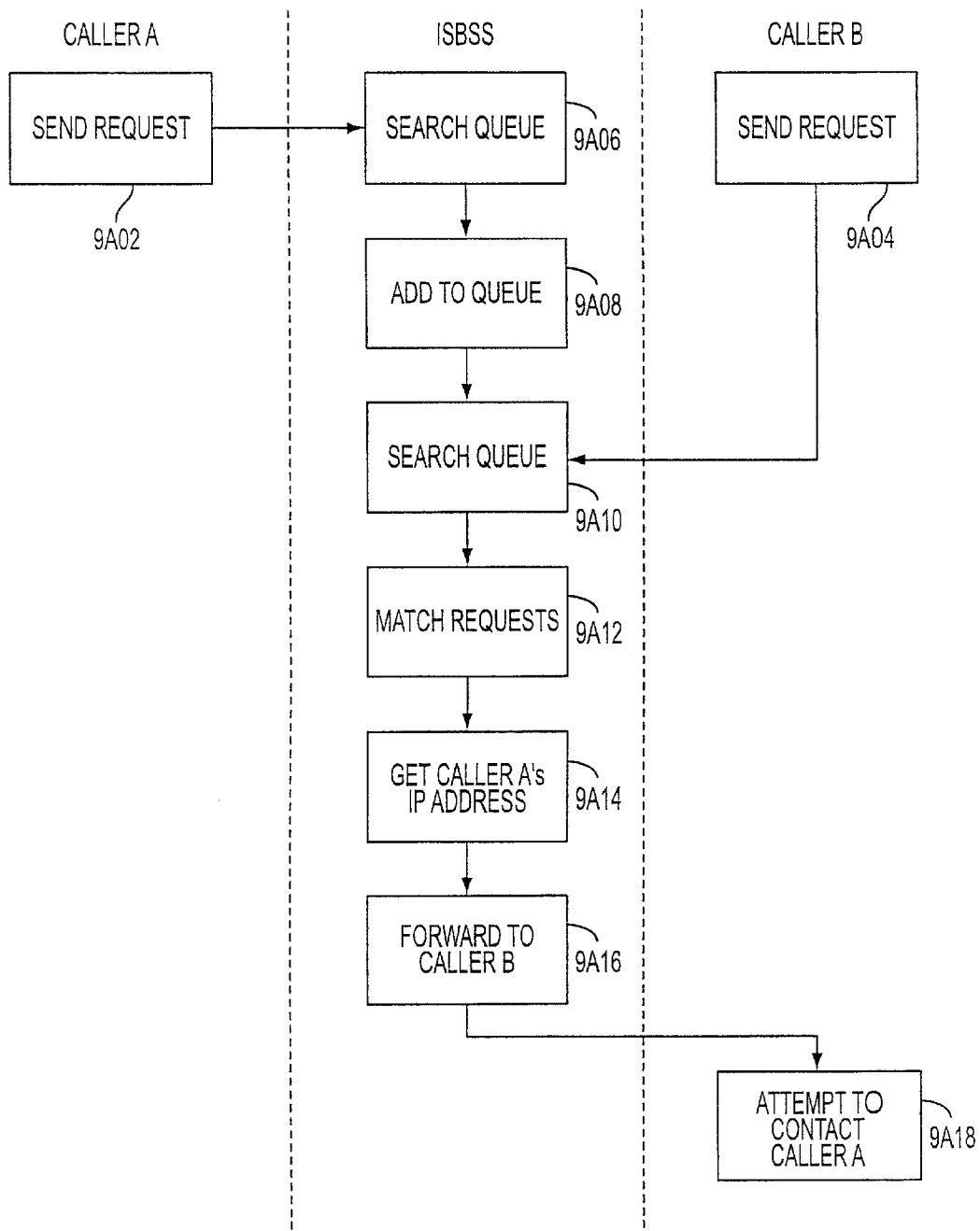
FIG. 9A shows a flow chart of operation of an ISBSS, which is a server used to complete calls.

FIG. 9 shows a connection between a customer's location 900C and an agent's position 900HD at the help desk. The help desk has one or more call center positions 900HD, each equipped with a standard telephone 211HD, a computer or data terminal 908 and a specially equipped ISB 100HD connected to computer or data terminal 908 via a serial port or other connection such as serial port 408 of FIG. 4. The customer connects to the help desk via PSTN 902, customer's ISP 904C, Internet 906 and help desk's ISP 904HD. The agent can use ISB 100HD to access, program, upgrade and test customer's ISB 100C. The agent can change the data stored in ISB 100C (for example, the device data, server data and owner data). The help desk does not have to change the data maintained automatically by ISB 100C or by other servers (e.g., friends data, billing data and service records). Also, the agent and the customer can talk via telephones 211C and 211HD, either in voice over data via the Internet or in voice-only mode via the Internet or the PSTN, so that the agent can answer the customer's questions. The user can initiate a voice-over-data conversation by dialing *0#.

Programming of the ISB from the help desk takes place in the following manner. The customer and the agent engage in a conversation, either by IT or by the PSTN. If the agent decides that the customer's ISB 100C is to be remotely programmed from the help desk, the agent instructs the customer to dial *0# into telephone 211C. The agent verifies that the customer's ISB 100C has accepted this code to go into voice-over-data mode and enters a similar command to set his own ISB 100HD to voice-over-data mode. The ISBs 100C and 100HD perform a modem handshaking and then start a PPP link between them. Once the link is established, the bandwidth is shared between voice and data, and the agent and the customer can resume their conversation while the agent accesses, examines and programs the customer's ISB 100C.

The agent's computer or data terminal 908 has software to allow the agent to access, examine and program the customer's ISB 100C in this manner. The software displays a window into which the agent enters his own identifying information, device data such as the serial number, feature key and hardware and software versions, server IP addresses, and the user data. The window also has buttons to allow the agent to read the data stored in the customer's ISB, write data to the customer's ISB, activate voice-over-data mode, save information about the customer's ISB to disk for future reference, and load that information from disk. The window offers menu options to allow the agent to log on and off his position at the help desk, to change the serial port settings for his position at the help desk, to select the source for data being accessed as local (the help desk position) or remote (the customer's ISB) and the like.

Figure 12:
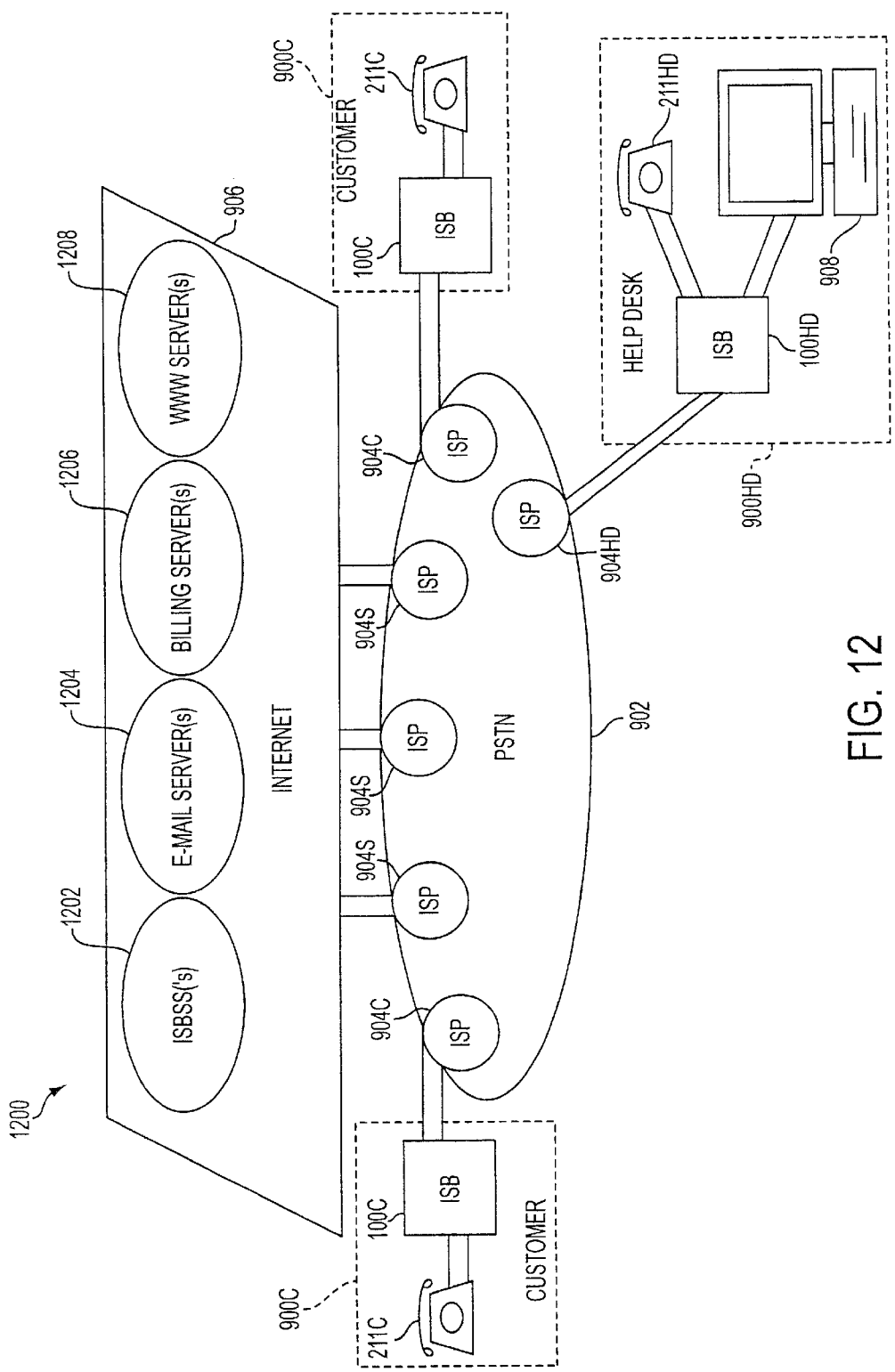
FIG. 12 shows a system defined by multiple users' ISB's, the PSTN, the Internet, the help desk, the ISBSS and various other servers.

As those skilled in the art will readily appreciate, the various components described above form a coherent system which is shown in FIG. 12. In this system, multiple customer locations 900C and help desk location 900HD, which have already been described, interface via PSTN 902 and ISPs 904C, 904HD with one another and with ISPs 904S, which allow access to one or more ISBSSs 1201, one or more e-mail (POP, SMTP, IMAP (which is another mail protocol), etc.) servers 1204, one or more billing servers 1206, one or more Web servers 1208 and any other servers or other system components which can be used.

The present invention can be adapted for use with the H.323 communication standard, which will now be described briefly with reference to FIG. 13. The H.323 standard provides interoperability among products from multiple vendors. The standard includes the H.320 standard for ISDN (integrated services digital network) communication and H.324 for the PSTN. The standard provides for encapsulation of UDP packets (which have been identified above) as RTP (real-time transport protocol) packets.

Figure 13:
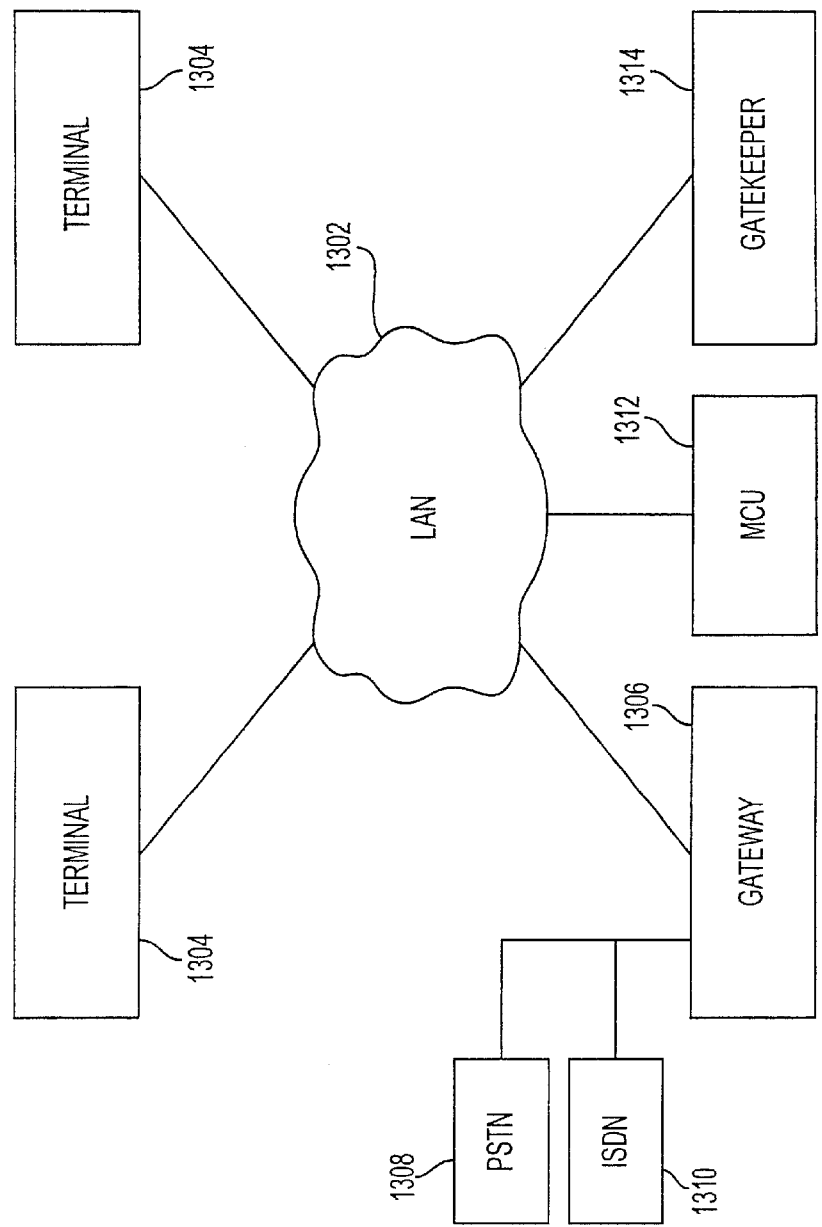
FIG. 13 shows an IT standard which may be implemented with the present invention.

FIG. 13 shows various components of an H.323 system. Those skilled in the art will readily appreciate that not all components shown in FIG. 13 will necessarily be present.

H.323 system 1300 is implemented on LAN (local-area network) 1302. Terminals 1304 are used by users to communicate; each terminal 1304 can include an ISB, with or without video capabilities, or an PC with audio or audio-video capabilities. Gateway 1306 provides interoperability with other networks, e.g., over PSTN 1308 or ISDN line 1310. MCU (multipoint control unit) 1312 control conferencing among three or more terminals. Gatekeeper 1314 performs network functions such as bandwidth control and translation between IP addresses and names by which terminals 1304, gateway 1306, etc. are known to LAN 1302.

The ISB software is written such that at any time during the operation the user can terminate whichever operation is in progress by simply hanging up the telephone and can hear a dial tone by picking up the telephone again. There might be instances in which the hang-up is not recognized by the software because of unexpected interactions between the software and real-life conditions. To prevent the ISB from locking up and possibly blocking the telephone from the user, a watchdog timer can be implemented to recover from these situations and reset the system. In all other instances in which the ISB recognizes that an error has occurred, it plays a prompt which in general terms explains the condition followed by an error code which helps the user to troubleshoot the problem by referring to the manual or which helps the agent at the help desk to diagnose the problem. The error codes have been listed above, although, of course, other error codes could be assigned as needed.

In the instances in which the ISB expects the user to enter data or hang up, a timer can be set with a predefined time-out value. If the user does not respond within time-out period, the prompt is repeated. This process can be repeated up to three times, and if there is no response from the user, then the ISB goes on-hook and, after a short delay, back off-hook.

The ISB can be tested at the factory or elsewhere in the following manner. The ISB is connected to a telephone and to a computer in the manner described above. The computer has appropriate testing software installed thereon. The tester makes a call through the ISB to a second ISB which has been tested and is known to work properly. Any aspect of operation of the ISB under test can be tested, and a report can be generated.

The foregoing detailed description covers interfacing a wireline analog version of the ISB and is illustrative of the various preferred embodiments of the present invention which also include wireline digital versions which are ISDN or LAN based as well as wireless analog or digital versions, either cellular or PCS (personal communication systems). The ISB can also be adapted to work with facsimile machines. The invention is not limited to embodiments using a SLIP, PPP or other dialup connection to the Internet; instead, any connection to the Internet or another secondary network, such as a T1 line or a cable modem, can be used. Also, while it is contemplated that a caller will usually want to speak to one called party at a time, conference calls can be implemented with no difficulty. In addition, ISBs can be made with inexpensive digital cameras and LCD screens to allow videophone service by using Internet audiovisual conferencing software such as CU-Seeme. ISBs can also be provided with encryption. Moreover, modifications disclosed separately can be combined in any technically feasible manner, while modifications disclosed together can be implemented separately wherever technically feasible. It will be appreciated that numerous variations and changes can be made not only to provide a range of services but also to interface the many different devices used to access the PSTN, including personal computers and laptops, without departing from the scope of the invention as defined in the accompanying claims.

We claim:

1. A device for dynamically adjusting a communication between a computing device and a digital packet-switched network, the device comprising:

detecting means for monitoring at least a portion of the communication and for detecting a baud rate and a percentage of dropped packets in said at least a portion of the communication;

determining means for making a determination, in accordance with the baud rate and the percentage of dropped packets, as to whether a degree of compression, a packetization and a packet redundancy in the communication are acceptable for the baud rate; and adjusting means for adjusting at least one of the degree of compression, the packetization and the packet redundancy in accordance with the determination.

2. A device as in claim 1, wherein the determining means comprises:

means for storing a look-up table; and means for making the determination by applying the baud rate and the percentage of dropped packets to the look-up table.

3. A device as in claim 1, wherein:

the packet redundancy is adjustable to a first state or a second state;

in the first state, each packet in the communication is sent twice; and in the second state, each packet in the communication is sent once.

4. A method for dynamically adjusting a communication between a computing device and a digital packet-switched network, the method comprising:

(a) monitoring at least a portion of the communication and detecting a baud rate and a percentage of dropped packets in said at least a portion of the communication;

(b) making a determination, in accordance with the baud rate and the percentage of dropped packets, as to whether a degree of compression, a packetization and a packet redundancy in the communication are acceptable for the baud rate; and (c) adjusting at least one of the degree of compression, the packetization and the packet redundancy in accordance with the determination.

5. A method as in claim 4, wherein step (b) comprises:

(i) storing a look-up table in a memory; and (ii) making the determination by applying the baud rate and the percentage of dropped packets to the look-up table.

6. A method as in claim 4, wherein:

the packet redundancy is adjustable to a first state or a second state;

in the first state, each packet in the communication is sent twice; and in the second state, each packet in the communication is sent once.

7. A server for allowing a first device and a second device to communicate over a packet-switched network, the server comprising:

means for receiving (i) a first communication request from the first device, the first communication request comprising first address information for locating the first device on the network, and (ii) a second communication request from the second device, the second communication request comprising second address information for locating the second device on the network; and means for (i) maintaining a communication request queue, (ii) adding a first received one of the first and second communication requests to the queue, (iii) searching the queue in accordance with a second received one of the first and second communication requests to match the first and second received ones of the first and second communication requests (iv) if the second received one of the first and second communication requests is the first communication request, providing the second address information to the first device, and (v) if the second received one of the first and second communication requests is the second communication request, providing the first address information to the second device.

8. A server as in claim 7, wherein each of the first and second address information comprises an IP address.

9. A method for allowing a first device and a second device to communicate over a packet-switched network, the method comprising:

(a) receiving a first communication request from the first device, the first communication request comprising first address information for locating the first device on the network;

(b) receiving a second communication request from the second device, the second communication request comprising second address information for locating the second device on the network;

(c) maintaining a communication request queue;

(d) adding a first received one of the first and second communication requests to the queue;

(e) searching the queue in accordance with a second received one of the first and second communication requests to match the first and second received ones of the first and second communication requests;

(f) the second received one of the first and second communication requests is the first communication request, providing the second address information to the first device; and (g) if the second received one of the first and second communication requests is the second communication request, providing the first address information to the second device.

10. A method as in claim 9, wherein each of the first and second address information comprises an IP address.

11. A system including a server, first and second devices, and a packet-switched network, said server for allowing a first device and a second device to communicate over a packet-switched network, the server comprising:

means for receiving (i) a first communication request from the first device, the first communication request comprising first address information for locating the first device on the network, and (ii) a second communication request from the second device, the second communication request comprising second address information for locating the second device on the network, and means for (i) maintaining a communication request queue, (ii) adding a first received one of the first and second communication requests to the queue, (iii) searching the queue in accordance with a second received one of the first and second communication requests to match the first and second received ones of the first and second communication requests (iv) if the second received one of the first and second communication requests is the first communication request, providing the second address information to the first device, and (v) if the second received one of the first and second communication requests is the second communication request, providing the first address information to the second device, said system further comprising a device for dynamically adjusting a communication between said first and second devices and said packet-switched network, said device comprising:

detecting means for monitoring at least a portion of the communication and for detecting a baud rate and a percentage of dropped packets in said at least a portion of the communication, determining means for making a determination, in accordance with the baud rate and the percentage of dropped packets, as to whether a degree of compression, a packetization and a packet redundancy in the communication are acceptable for the baud rate, and adjusting means for adjusting at least one of the degree of compression, the packetization and the packet redundancy in accordance with the determination.

* * * * *